United States Patent
Stevens et al.

(10) Patent No.: US 8,345,953 B2
(45) Date of Patent: Jan. 1, 2013

(54) STEREOSCOPIC MEASUREMENT SYSTEM AND METHOD

(75) Inventors: George B. Stevens, Cedar Park, TX (US); Grady A. Clendening, Cedar Park, TX (US); Windflower Waters, Austin, TX (US); Steven Weintraub, Austin, TX (US); Warren Redden, Gypsum, KS (US); Vivian Redden, legal representative, Gypsum, KS (US); Carl Redden, Gypsum, KS (US); Robert W. Srack, Bennington, KS (US); Janet M. Srack, Bennington, KS (US)

(73) Assignee: Matrix Electronic Measuring Properties, LLC, Salina, KS (US)

( * ) Notice: Subject to any disclaimer, the term of this patent is extended or adjusted under 35 U.S.C. 154(b) by 1259 days.

(21) Appl. No.: 12/125,794

(22) Filed: May 22, 2008

(65) Prior Publication Data
US 2009/0290786 A1 Nov. 26, 2009

(51) Int. Cl.
*G06K 9/00* (2006.01)
(52) U.S. Cl. .................................................. 382/154
(58) Field of Classification Search ................... 382/154
See application file for complete search history.

(56) References Cited

U.S. PATENT DOCUMENTS

| | | | |
|---|---|---|---|
| 4,329,784 A | 5/1982 | Bjork | |
| 4,513,508 A | 4/1985 | Jarman et al. | |
| 4,598,481 A | 7/1986 | Donahue | |
| 4,630,379 A | 12/1986 | Wickmann et al. | |
| 4,811,250 A | 3/1989 | Steber et al. | |
| 4,934,063 A | 6/1990 | Speisser | |
| 4,997,283 A | 3/1991 | Danielson et al. | |
| 5,029,397 A | 7/1991 | Palombi | |
| 5,054,207 A | 10/1991 | Marshall | |
| 5,125,164 A | 6/1992 | Fournier et al. | |
| 5,144,487 A | 9/1992 | Hersey | |
| 5,193,288 A | 3/1993 | Stifnell | |
| 5,295,073 A | 3/1994 | Celette | |
| 5,335,420 A | 8/1994 | Kling, III et al. | |
| 5,383,454 A | 1/1995 | Bucholz | |
| 5,502,898 A | 4/1996 | Manore | |
| 5,515,613 A | 5/1996 | Hinson | |
| 5,622,170 A | 4/1997 | Schulz | |
| 5,644,854 A | 7/1997 | Bergeron | |
| 5,696,705 A | 12/1997 | Zykan | |
| RE35,816 E | 6/1998 | Schulz | |
| 5,784,792 A | 7/1998 | Smith | |
| 6,105,264 A | 8/2000 | Phillips | |
| 6,115,927 A | 9/2000 | Hendrix | |
| 6,165,181 A | 12/2000 | Heilbrun et al. | |

(Continued)

OTHER PUBLICATIONS

International Search Report regarding PCT/US2009/044791 dated Jul. 17, 2009, two (2) pages.

(Continued)

*Primary Examiner* — Wesley Tucker
(74) *Attorney, Agent, or Firm* — Polsinelli Shughart PC

(57) ABSTRACT

A stereoscopic measurement system captures stereo images and determines measurement information for user-designated points within stereo images. The system comprises an image capture device for capturing stereo images of an object. A processing system communicates with the capture device to receive stereo images. The processing system displays the stereo images and allows a user to select one or more points within the stereo image. The processing system processes the designated points within the stereo images to determine measurement information for the designated points.

21 Claims, 22 Drawing Sheets

U.S. PATENT DOCUMENTS

| | | | |
|---|---|---|---|
| 6,601,309 | B1 | 8/2003 | Hedstrom |
| 6,977,679 | B2 * | 12/2005 | Tretter et al. ............... 348/231.2 |
| 7,206,080 | B2 * | 4/2007 | Kochi et al. ................... 356/611 |
| 2001/0010546 | A1 | 8/2001 | Chen |
| 2002/0002330 | A1 | 1/2002 | Vilsmeier |
| 2002/0029128 | A1 | 3/2002 | Jones et al. |
| 2002/0038084 | A1 | 3/2002 | Pelzer et al. |
| 2002/0066193 | A1 | 6/2002 | Hodge |
| 2002/0087075 | A1 | 7/2002 | Bucholz |
| 2002/0104390 | A1 | 8/2002 | Jones |
| 2003/0090681 | A1 | 5/2003 | Jones et al. |
| 2003/0174204 | A1 | 9/2003 | Otani et al. |
| 2004/0165776 | A1 | 8/2004 | Brouwer |
| 2004/0179729 | A1 | 9/2004 | Imai et al. |
| 2005/0068452 | A1 | 3/2005 | Steinberg et al. |
| 2005/0180623 | A1 | 8/2005 | Mueller et al. |
| 2006/0082644 | A1 * | 4/2006 | Tsubaki ........................... 348/42 |
| 2008/0024596 | A1 * | 1/2008 | Li et al. ........................... 348/47 |

OTHER PUBLICATIONS

International Search Report regarding PCT/US2009/044793 dated Jul. 14, 2009, two (2) pages.
International Search Report regarding PCT/US2009/044789 dated Jul. 16, 2009, two (2) pages.
Written Opinion regarding PCT/US2009/044791 dated Jul. 17, 2009, seven (7) pages.
Written Opinion regarding PCT/US2009/044793 dated Jul. 14, 2009, three (3) pages.
Written Opinion regarding PCT/US2009/044789 dated Jul. 16, 2009, eight (8) pages.
Translated Russian Office Action regarding Russian Application No. 2010152366 issued Jul. 17, 2012, 7 pages.
Notice of Allowance regarding U.S. Appl. No. 12/125,809, issued Jun. 6, 2012, 18 pages.
Office Action regarding U.S. Appl. No. 12/125,801, issued Jun. 5, 2012, 39 pages.

* cited by examiner

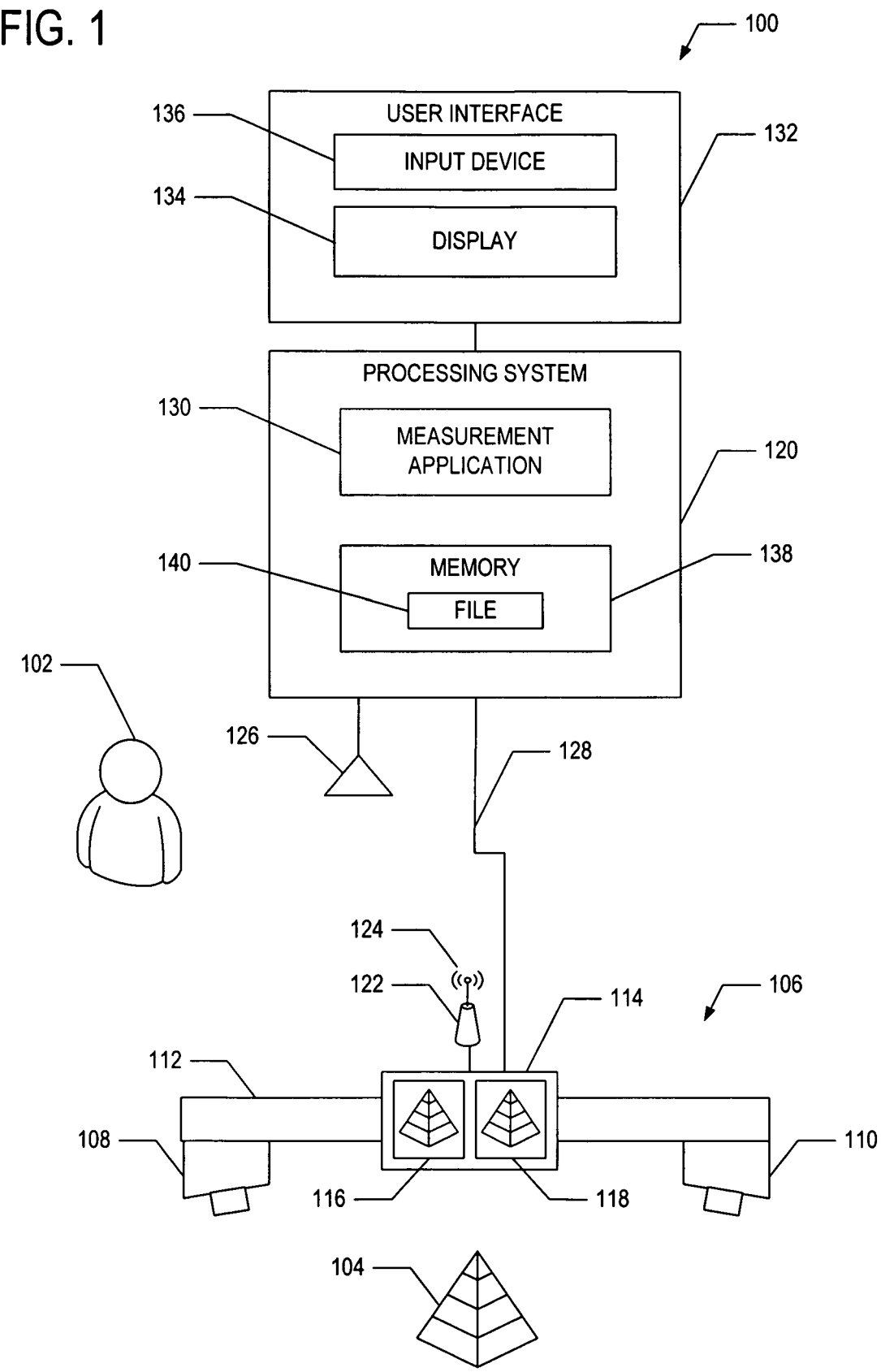

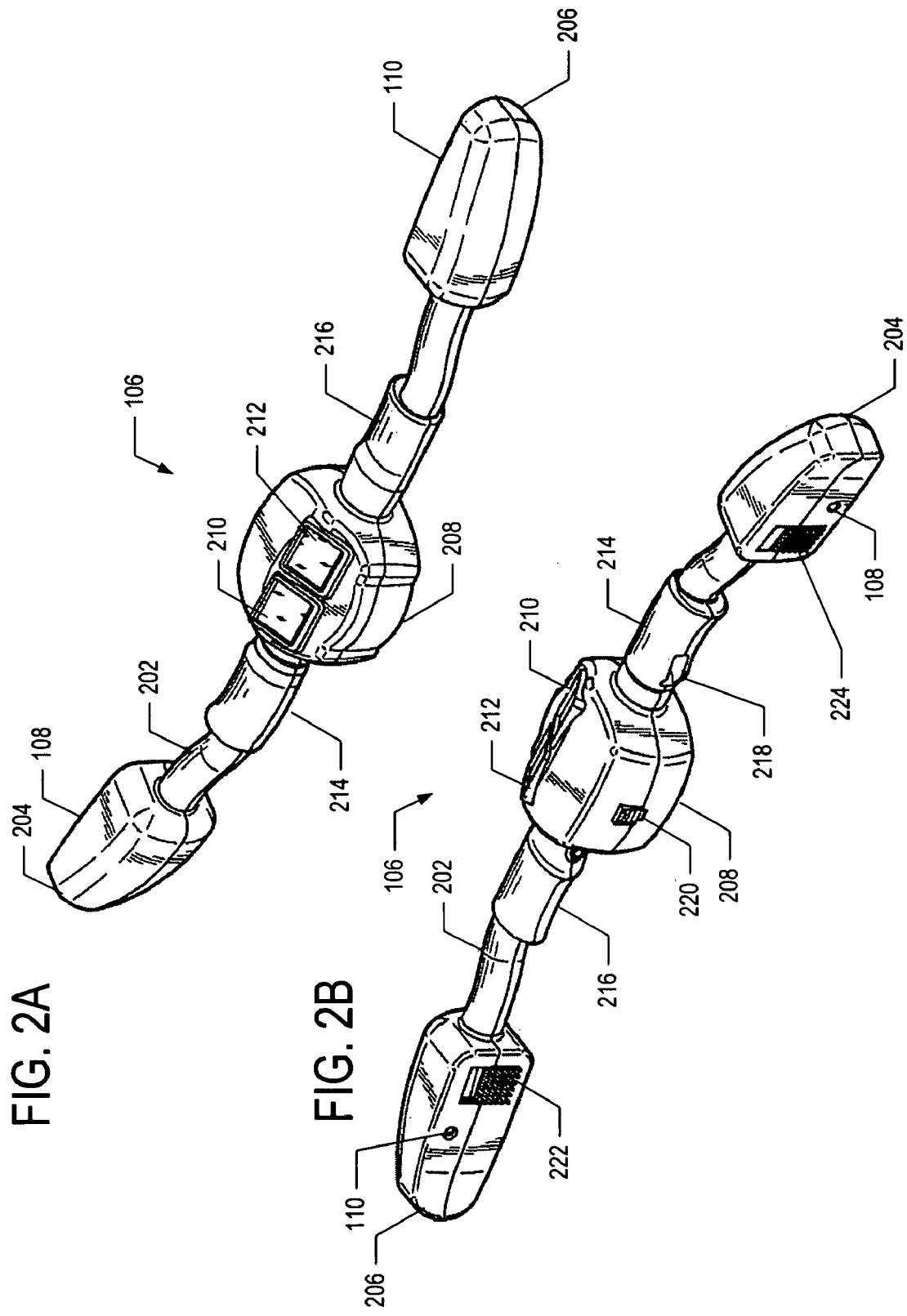

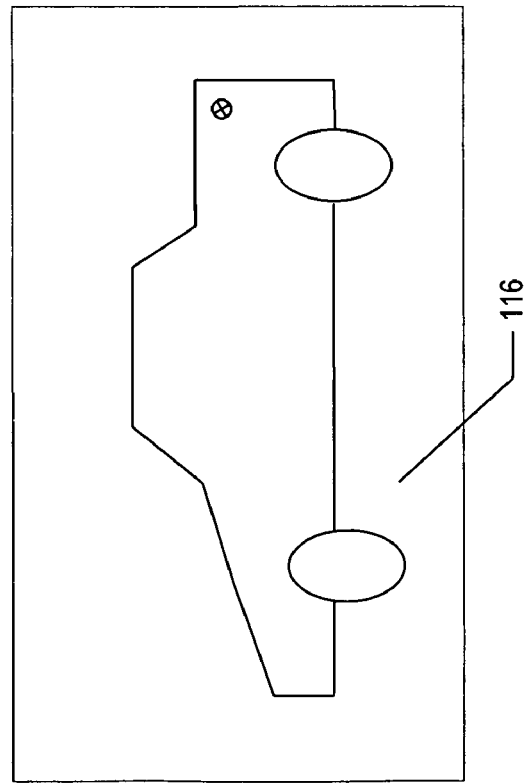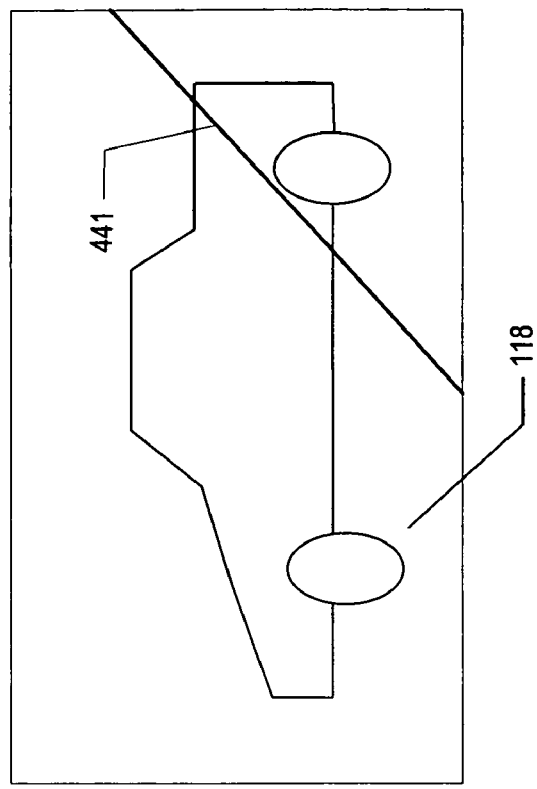
FIG. 4D

STEREOSCOPIC MEASUREMENT SYSTEM AND METHOD

RELATED APPLICATIONS

This application is related to co-pending, co-owned U.S. patent application Ser. No. 12/125,801, entitled Stereoscopic Measurement System and Method and U.S. patent application Ser. No. 12/125,809, entitled Stereoscopic Measurement System and Method, the entire contents of which are incorporated herein by reference.

FEDERALLY SPONSORED RESEARCH OR DEVELOPMENT

Not Applicable.

COMPACT DISK APPENDIX

Not Applicable.

BACKGROUND

Stereoscopic imaging, or stereoscopy, is used to obtain three-dimensional information about an object based on a pair of two-dimensional images of that object. In general, stereoscopic imaging involves visually combining at least two images of an object, taken from slightly different viewpoints, to produce the illusion of three-dimensional depth. By obtaining the two stereo images from slightly different perspectives, coordinate locations of desired measurement points identified in both images can be more accurately determined.

Stereoscopic imaging is the basis for photogrammetry, which involves producing stereograms or a pair of stereo images of an object in order to determine geometric properties and/or measurement information about the object. Photogrammetry is used in various fields such as manufacturing, architectural surveying, building preservation, and archaeology in order to obtain measurement information for an object of interest. When obtaining measurements between particular measurement points on a desired object via photogrammetry, it is generally required that the same measurement points are designated in both images to obtain accurate measurement information.

With the advent of digital image sensors, computer-based image processing techniques have been developed and applied to photogrammetry. However, the increase in digital image sensor resolution and advancements in computer image-processing has not been efficiently utilized for stereoscopic measurement purposes. Moreover, there is a need for a stereoscopic processing system that allows a user to easily designate the same measurement points in stereo images of an object to obtain more accurate measurements.

SUMMARY

According to one aspect, a system is provided for obtaining measurements of an object. The system comprises a portable image capture device to capture first and second images of a plurality of objects and to transmit the first and second images. The system also comprises a processing system comprising a measurement application executable on the processing system. The measurement application comprises a pairing module to store a stereo image pair in a memory for each of the plurality of objects. The stereo image pair comprises first and second images of a particular object that were simultaneously captured. The measurement application further comprises a user interface (UI) module to generate a list of stereo image pairs for display and to generate corresponding first and second images of a selected one of the list of stereo image pairs for display. The UI module is further configured to receive a first user input designating a first measurement point in the corresponding first image, a second user input designating a second measurement point in the corresponding first image, a third user input designating the first measurement point along a selection assist line in the corresponding second image, and a fourth user input designating the second measurement point along another selection assist line in the corresponding second image. The measurement application further comprises a point selection module to identify a range of points in the corresponding second image based on the first measurement point designated in the corresponding first image, to generate the selection assist line in the corresponding second image based on the range of points, to identify another range of points in the corresponding second image based on the second measurement point designated in the corresponding first image, and to generate the other selection assist line in the corresponding second image based on the other range of points. The measurement application further comprises a stereo point module to define a first stereo point based on the first measurement point designated in the corresponding first and second images and to define a second stereo point based on the second measurement point designated in the corresponding first and second images. The measurement application also comprises a cross measure module to calculate a distance between the first stereo point and the second stereo point.

According to another aspect, a system is provided for obtaining measurements of an object. The system comprises a hand-held image capture device to capture a stereo image of each of a plurality of objects. Each stereo image comprises first and second images of a particular one of the plurality of objects. The hand-held image capture device comprises a first camera to capture the first image of the object, a second camera to capture the second image of the object, and a communication port to transmit the first and second images. The system also comprises a processing system comprising a measurement application executable on the processing system. The measurement application comprises a user interface (UI) module to generate corresponding first and second images of a selected stereo image for display. The user interface is also configured to receive a first user input designating a first measurement point in the corresponding first image, a second user input designating a second measurement point in the corresponding first image, a third user input designating the first measurement point in the corresponding second image along a selection assist line, and a fourth user input designating the second measurement point in the corresponding second image along another selection assist line. The measurement application further comprises a point selection module to identify a range of points in the corresponding second image based on the first measurement point designated in the corresponding first image, to generate the selection assist line in the corresponding second image based on the range of points, to identify another range of points in the corresponding second image based on the second measurement point designated in the corresponding first image, and to generate the other selection assist line in the corresponding second image based on the other range of points. The measurement application further comprises a stereo point module to define a first stereo point that corresponds to the first measurement point designated in the corresponding first and second images and to define a second stereo point that corresponds to the second measurement point designated in the corresponding first and second images. The measurement application also comprises a cross measure module to calculate a distance between the first stereo point and the second stereo point.

According to another aspect, a method is provided for obtaining measurements of an object. The method comprises capturing first and second images of a plurality of objects at an image capture device. The method further comprises transmitting the first and second images from the image capture device to a processing system. The method further comprises storing first and second images of a particular object that were captured simultaneously as a stereo image pair in a memory of the processing system. The method further comprises generating a list of stereo image pairs stored in the memory for display. The method further comprises displaying corresponding first and second images of a selected one of the list of stereo image pairs. The method further comprises receiving a first user input designating a first measurement point in the corresponding first image and receiving a second user input designating a second measurement point in the corresponding first image. The method further comprises identifying a range of points in the corresponding second image based on the first measurement point designated in the first image and identifying another range of points in the corresponding second image based on the second measurement point designated in the first image. The method further comprises generating a first selection assist line in the corresponding second image based on the range of points and generating a second selection assist line in the corresponding second image based on the other range of points. The method further comprises receiving a third user input designating the first measurement point in the second image along the first selection assist line and receiving a fourth user input designating the second measurement point in the second image along the second selection assist line. The method further comprises defining a first stereo point based on the first measurement point and a second stereo point based on the second measurement point. The method also comprises calculating a distance between the first stereo point and the second stereo point and displaying the calculated distance.

According to another aspect, a method is provided for obtaining measurements from stereo images of an object. The stereo image comprises first and second images. The method comprises capturing the stereo image at a hand-held image capture device. The hand-held image capture device comprises a first camera, a second camera, and a communication port. The method further comprises capturing the first image of the object at the first camera. The method further comprises capturing the second image of the object at the second camera. The method further comprises transmitting the first and second images from the communication port. The method further comprises receiving the first and second images at a processing system and, in response thereto, generating the first image and the second image for display. The method further comprises receiving a first user input designating a first measurement point in the first image and receiving a second user input designating a second measurement point in the first image. The method further comprises identifying a range of points in the second image based on the first measurement point designated in the first image and identifying another range of points in the second image based on the second measurement point designated in the first image. The method further comprises generating a selection assist line in the second image based on the range of points and generating another selection assist line in the second image based on the other range of points. The method further comprises receiving a third user input designating the first measurement point in the second image along the selection assist line and receiving a fourth user input designating the second measurement point in the second image along the other selection assist line. The method further comprises defining a first stereo point that corresponds to the first measurement point and defining a second stereo point that corresponds to the second measurement point. The method also comprises calculating a distance between the first stereo point and the second stereo point.

BRIEF DESCRIPTION OF THE DRAWINGS

FIG. 1 is a block diagram of a stereoscopic measurement system in accordance with an aspect of the present invention.

FIGS. 2A and 2B are perspective views of a stereo image capture device according to an aspect of the stereoscopic measurement system.

FIGS. 4A-4F are screen views of image management forms.

DETAILED DESCRIPTION

Figure 3A:
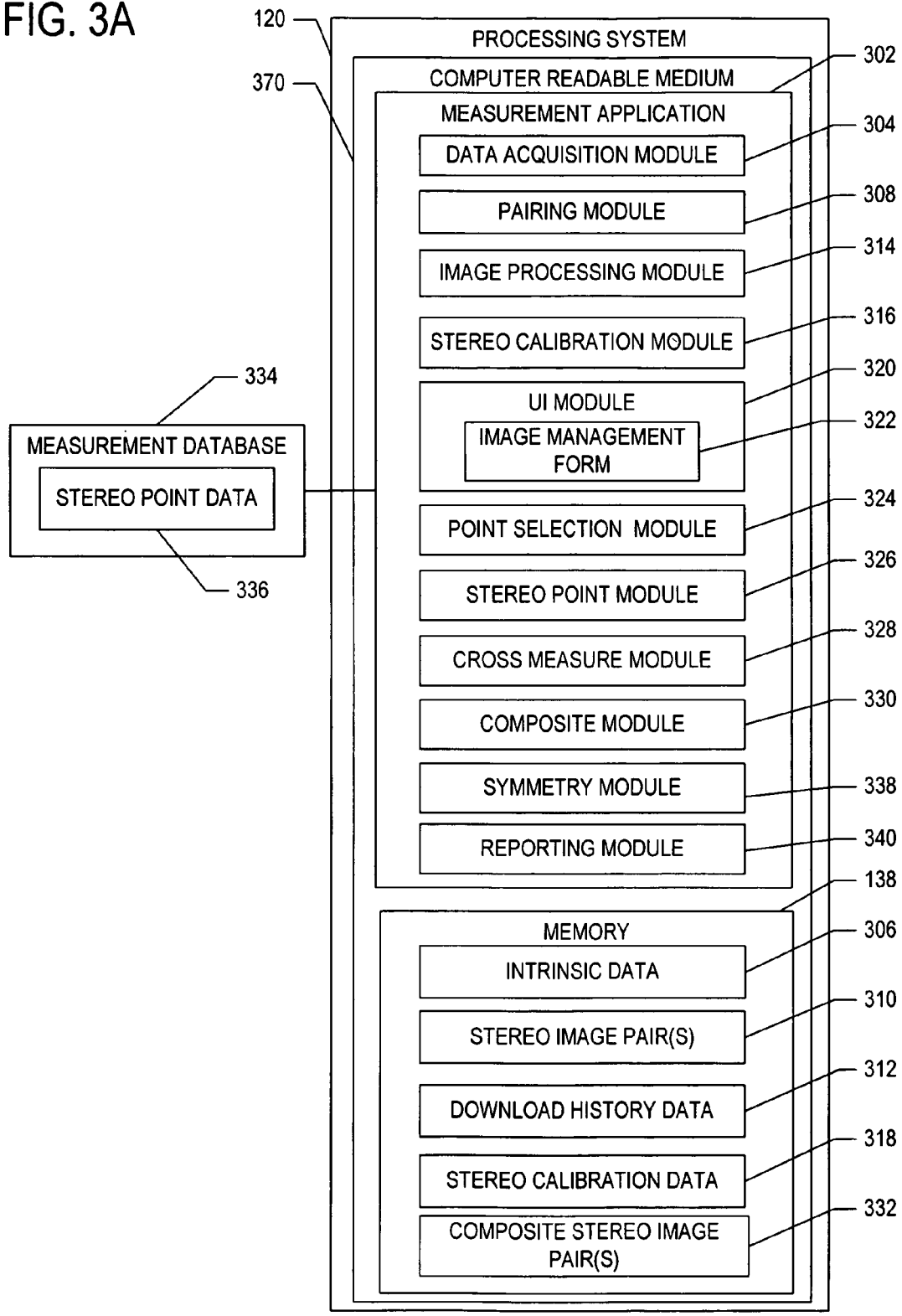
FIG. 3A is a block diagram of a stereoscopic measurement application according to one aspect of the stereoscopic measurement system.

Aspects of the stereoscopic measurement system and method described herein allow a user to generate stereo images of an object, to designate points within the stereo images of the object, and to obtain precision measurements in reference to the designated points. One advantage of the system is the provision of a portable capture device that allows a user to capture stereo images of objects at remote locations. The portable capture device transmits stereo images to a processing system to display the stereo images and to determine precision measurements between designated points within the stereo images. Furthermore, the system can be deployed in various environments, and is more portable and cost effective than conventional measuring systems.

FIG. 1 depicts an exemplary aspect of a stereoscopic measurement system 100. The stereoscopic measurement system 100 enables a user 102 to capture stereo images of an object 104 with a stereo image capture device 106. The stereo image capture device 106 comprises a left camera 108 and a right camera 110. The left camera 108 and right camera 110 are, for example, digital pinhole cameras located on opposing ends of a frame member 112.

A monitor 114 is centrally disposed between the left camera 108 and the right camera 110 on the frame member 112. The monitor 114 is configured to display a left image 116 captured by the left camera 108 and a right image 118 captured by the right camera 110. Although a single monitor 114 is depicted in FIG. 1, it is contemplated that separate monitors, such as depicted in FIGS. 2A and 2B, can be used to display the left image 116 and the right image 118.

Referring briefly to FIGS. 2A and 2B, aspects of an exemplary stereo image capture device 106 are depicted. In this aspect, the stereo image capture device 106 is a portable hand-held apparatus that comprises a backbone 202 that is sufficiently rigid to limit flexing. For example, the backbone 202 can be constructed from a lightweight material, such as plastic or another suitable material.

A left pod 204 is affixed to the left end of the backbone 202 and a right pod 206 is affixed to the right end of the backbone 202. The left pod 204 is configured to house the left camera 108, and the right pod 206 is configured to house the right camera 110.

A hub 208 is located at the center of the backbone 202 and houses a power source (not shown) for powering the left and right cameras 108, 110. For example, according to one aspect, the hub 208 comprises a battery compartment (not shown) that receives a battery. According to another aspect, the hub 208 comprises power input terminals (not shown) configured to connect with a power cord that is connected to a power outlet.

According to another aspect, the hub 208 comprises a left monitor 210 and a right monitor 212. The left monitor 210 and the right monitor 212 are, for example, liquid crystal display (LCD) monitors. The left monitor 210 is connected to the left camera 108 and displays the left image 116. The right monitor 212 is connected to the right camera 110 and displays the right image 118 of the object 104. The user 102 maneuvers the stereo image capture device 106 to display left and right images 116, 118 of a desired portion of the object 104 via the left and right monitors 210, 212. The central location of the monitors 210, 212 allows the user 102 to conveniently determine a common field of view for the left and right cameras 108, 110.

A left handle 214 is located to the left of the hub 208 and a right handle 216 is located to the right of the hub 208. Notably, it is contemplated that the handles 214, 216 of the image capture device 106 can be located in a different position or locations. The user 102 holds the image capture device 106 via the left handle 214 and right handle 216. According to one aspect, the left handle 214 comprises a switch 218 that controls the electronic shutters of the left camera 108 and the right camera 110. The switch 218 is wired to the left and right cameras 108, 110 to ensure that the corresponding left and right images 116, 118 are captured simultaneously. For example, when the left monitor 210 and right monitor 212 (or a single monitor 114) displays the left and right images 116, 118 of the desired area, the user 102 actuates or toggles the switch 218 to capture the left and right images 116, 118.

According to one aspect, the left camera 108 and right camera 110 are configured to transfer images and image data to the hub 208 via universal serial bus ("USB") cables. For example, the left camera 108 is wired to a communication port 220 by a USB cable, and the right camera 110 is wired to the communication port 220 by another USB cable.

According to another aspect, the hub 208 is mounted on a swivel such that it can be rotated independently from the left camera 108 and the right camera 110. As a result, the user 102 can view the monitors 210, 212 regardless of the orientation of the right and left cameras 108, 110.

According to another aspect, lamps 222, 224 are located next to the left and right cameras 108, 110. The purpose of the lamps 222, 224 is to illuminate the object 104 during capture of the left and right images 116, 118. In one example, the lamps 222, 224 are configured to turn on, or flash, when the switch 218 is toggled. In another example, the lamps 222, 224 are configured to turn on when a separate switch (not shown) is toggled.

Referring back to FIG. 1, the image capture device 106 is configured to transfer the left image 116 and the right image 118 to a processing system 120 for processing via a wired or wireless communication link. According to one aspect, the image capture device 106 is configured to wirelessly transfer images to the processing system 120 in response to the user 102 actuating a transmit switch (not shown) on the image capture device 106. In one example, a wireless transmitter 122 is connected to the image capture device 106 via the communication port 220. The transmitter 122 transmits a signal 124 comprising image data representative of the left and right images 116, 118. Although the transmitter 122 is depicted external to the image capture device 106, it is contemplated that the transmitter 122 may be integrated into the image capture device 106.

A wireless receiver 126 is connected to the processing system 120 and receives the signal 124 from the transmitter 122. The transmitter 122 and corresponding receiver 126 may utilize a Gigabit Ethernet link, IEEE 802.11 link, Ultra-Wide Band (UWB) link, or any other suitable wireless communication link. The wireless transmitter 122 and wireless receiver are optional in some embodiments.

According to another aspect, the image capture device 106 transfers the left image 116 and the right image 118 from the image capture device 106 to the processing system 120 via a wired connection 128 in response to the user 102 actuating the transmit switch (not shown). Alternatively, the processing system 120 automatically downloads images from the capture device 106 in response to detecting the wired connection 128 between the image capture device 106 and the processing system 120. The wired connection 128 can be a USB connection, a FireWire connection, or any other suitable wired connection.

The processing system 120 comprises a stereoscopic measurement application ("measurement application") 130. The measurement application 130 comprises executable modules or instructions that enable the processing system 120 to process image data, display stereo images, and to obtain precise measurement data for designated points within stereo images. In one aspect, the processing system 120 is a remote computer, such as a laptop computer or a personal computer station. In another aspect, the processing system 120 is a server computer.

A user interface (UI) 132 enables the user 102 to select images and/or to issue processing commands. Processing commands comprise, for example, commands to initiate image data acquisition from the image capture device 106 and/or commands to initiate image data analysis. In one example, the UI 132 comprises a display 134, such as a computer monitor, for viewing image data and an input device 136, such as a keyboard or a pointing device (e.g., mouse, trackball, pen, touch pad, or other device), for allowing the user 102 to interact with the image data.

The UI 132 is configured to display one or more input forms via the display 134. The input forms enable the user 102 to select image data for viewing and/or editing. The input forms also enable the user 102 to designate points within stereo images and to display measurement information for the designated points.

According to one aspect, the processing system 120 comprises a memory 138 for storing stereo image data for a particular object 104, including processed and/or raw image data. For example, the memory 138 comprises one or more files 140 each comprising processed and/or unprocessed image data for the object 104.

In one operational example, the stereoscopic measurement system 100 compares user-designated points within stereo images of the object 104 with known reference points for that object. By comparing user 102 designated points within stereo images of an object 104, such as a damaged vehicle to corresponding reference points of an undamaged vehicle, the measurement system 100 determines one or more measurements between the designated points and the reference points to quantify an amount of damage to the vehicle.

In another operational example, the stereoscopic measurement system 100 detects a change in an object 104 that occurs over a period of time. For example, the stereoscopic measurement system 100 is used to calculate a current distance between two user-designated points in the stereo images of the exterior of a building. One of the designated points is, for example, a reference point such as a ground elevation benchmark that remains substantially constant over time. The other designated point is, for example, a target point on the exterior of the building. After a period of time has elapsed, the stereoscopic measurement system 100 is used to calculate the distance between the same reference point and the same target point of the building. Accordingly, a change in the calculated distance between the reference point and target point indicates, for example, that the foundation of the building has shifted and/or some other structural deviation has occurred.

Although the stereoscopic measurement system 100 is described herein as being used to obtain measurement data for vehicles and/or buildings, it is contemplated that the system 100 can be used to obtain measurements for any object 104 for which stereo images can be captured.

As another example, the stereoscopic measurement system 100 can be used to catalog a three dimensional image of an artifact or personal property, such as a vase. For instance, the stereoscopic measurement system 100 is used to capture various stereoscopic images of the vase. Thereafter, measurements can be calculated between selected points on the vase in all three dimensions. Thereafter, these measurements can catalog and later used to verify the authenticity of the vase and/or to generate a replica of the vase.

FIG. 3A depicts an exemplary stereoscopic measurement application 302 (e.g., measurement application 130) according to one aspect of the measurement system 100. The measurement application 302 comprises modules that enable the processing system 120 to process image data, to generate stereo images, and to obtain precise measurements for user designated points within a generated stereo image.

A data-acquisition module 304 is configured to receive image data from the image capture device 106. For example, when the wired connection 128 connects the image capture device 106 and the processing system 120, the data acquisition module 304 detects the wired connection 128 and receives the left and right images 116, 118 from the image capture device 106. As another example, when the left and right images 116, 118 are being transferred to the processing system 120 via a wireless communication, the data acquisition module 304 detects the wireless communication from the image capture device 106 via the receiver 126 and receives the left and right images 116, 118 from the image capture device 106. According to one aspect, the left and right images 116, 118 images are deleted from the left and right cameras 108, 110 after being transferred to the processing system 120.

According to another aspect, the data acquisition module 304 is configured to retrieve intrinsic data 306 from the left and right cameras 108, 110 for storage in the memory 138. As used herein, intrinsic data for a camera refers to geometric and optical characteristics of the lens and the camera as determined via a camera calibration process.

Camera calibration is the process of relating the ideal model of the camera to the actual physical device and determining the position and orientation of the camera with respect to a world reference system. Stereoscopic calibration typically involves an internal or intrinsic calibration process and an external or stereo calibration process. As described in more detail below, stereo calibration typically involves determining the position and orientation of the left camera 108 and right camera 110 relative to each other with respect to a world reference system.

The purpose of intrinsic calibration is to determine intrinsic data 306, such as lens distortion, focal length, and the principal point of an image for a particular camera. Intrinsic data 306 is determined separately for each of the left and right cameras 108, 110. According to one aspect, intrinsic calibration is performed during the final stages of the manufacturing process of the image capture device 106. For example, after the image capture device 106 has been assembled and is operable, intrinsic data 306 is determined separately for each of the left camera 108 and right camera 110.

According to one aspect, the determined intrinsic data 306 for the left camera 108 is stored in a memory of the left camera 108, and the determined intrinsic data 306 for the right camera 110 is stored in a memory of the right camera 110. In one aspect, the determined intrinsic data 306 is stored as XML files in the memory of each camera. By determining intrinsic data 306 for each camera, the imperfections of a point on an image can be effectively neutralized, thereby linking the point with the corresponding coordinates in the camera coordinate system.

Figure 3B:
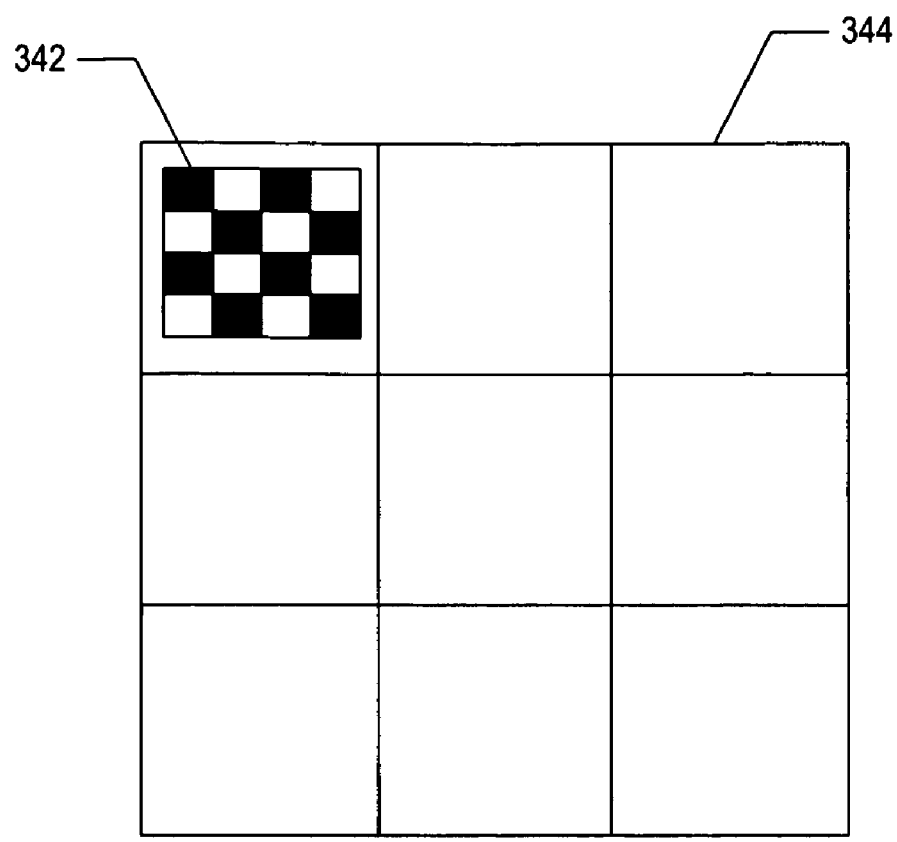
FIGS. 3B-3D are image views of a camera sectioned for intrinsic camera calibration.
Figure 3C:
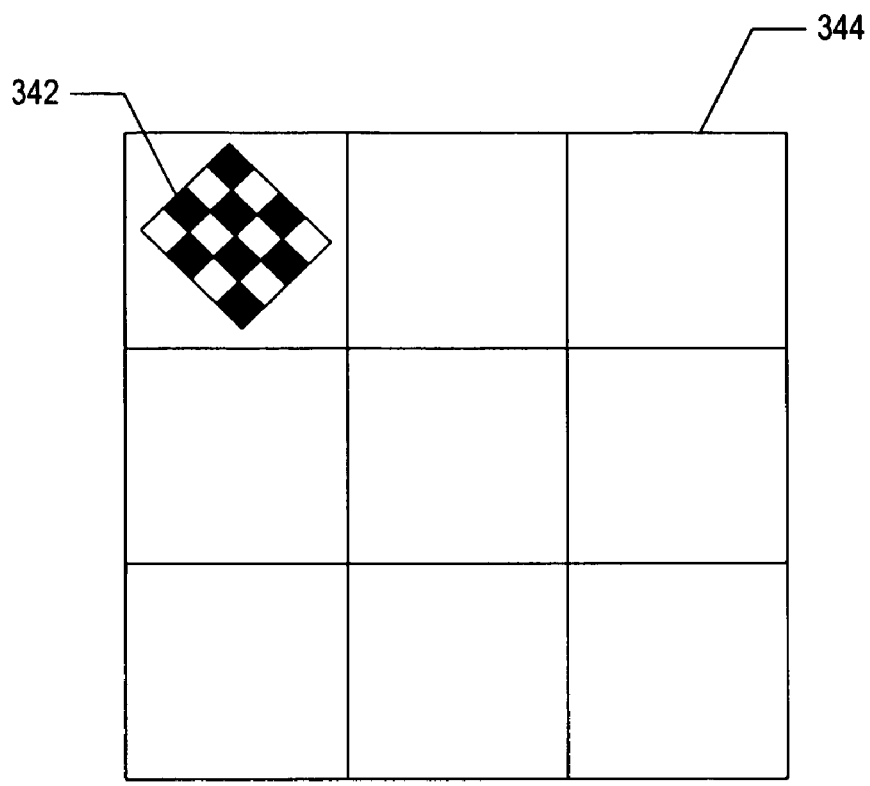
Figure 3D:
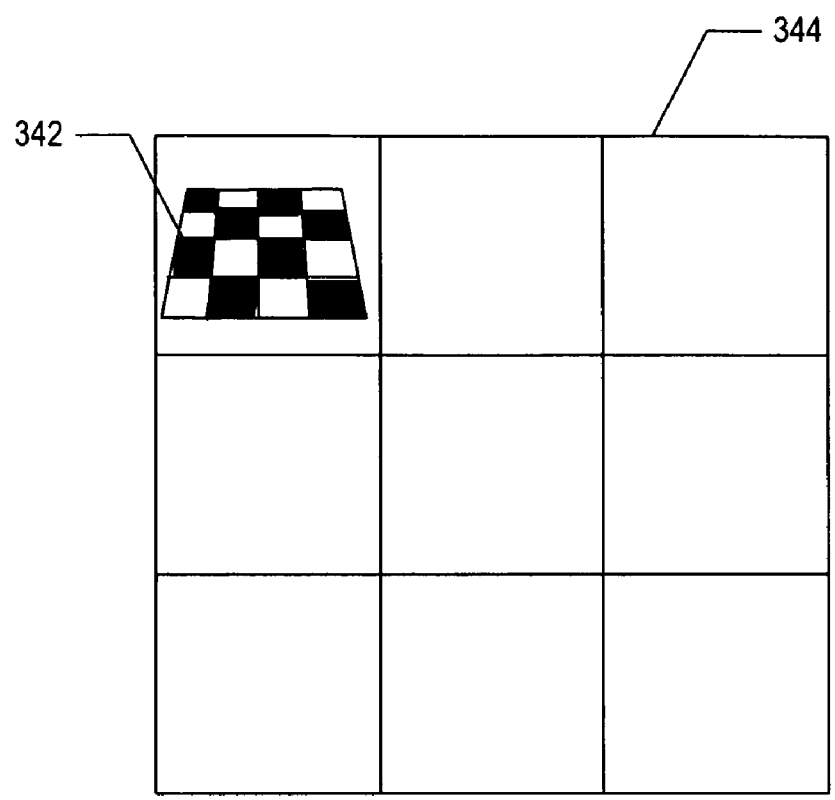

According to one aspect, intrinsic data 306 is determined for each of the left and right cameras 108, by first capturing a series of photos of a calibration image or jig 342 such as shown in FIGS. 3B-3D. According to one aspect, the calibration image consists of alternating black and white squares or rectangles arranged in a planar checkerboard pattern. The series of photos are obtained for various orientations of the calibration image 342.

In one example, the field of view of each camera, or image view space, 344 is divided into nine sections (i.e., three rows and three columns). FIG. 3B depicts the calibration image 342 in a first orientation positioned in a section of the image view space 344 that corresponds to the top row and the left column. Images of the calibration image 342 in the first orientation are captured in each of the nine sections by each camera. FIG. 3C depicts the calibration image 342 in a second orientation (e.g., rotated approximately forty-five degrees). Images of the calibration image 342 in the second orientation are captured in each of the nine sections by each camera. FIG. 3D depicts the calibration image 342 in a third orientation (e.g., tilted backward approximately forty-five degrees). Images of the calibration image 342 in the third orientation are captured in each of the nine sections by each camera.

The dimensions of the individual checker patterns are known. As a result, the camera intrinsic values of focal length, lens distortion, and principal point location can be determined. For example, image processing techniques are used to identify the corners of each square in the checkerboard and construct perspective lines connecting these corners. If the perspective lines are slightly curved instead of straight, a formula can be derived to straighten their curviness and used thereafter to remove image distortions. As a result, the formula can be used to establish a mapping of world straight lines to image straight lines. In one example, this formula is a row vector of scalar values representing lens distortion and the misalignment of the optical axis center of the image plane, called the principal point, to the mechanical axis of the image plane. The two corners along any edge of a square in the checkerboard correspond to pixels representing these corners on the image plane. Homogeneous vectors drawn from the image sensor cross at the focal point and pass through the corners of the square of known size. The focal length is determined as the height of the triangle formed by these two lines from the image plane to the planar checkerboard pattern.

According to another aspect, the data acquisition module 304 is configured to determine if the intrinsic data 306 retrieved from the left camera 108 and right camera 110 has been updated before storing the intrinsic data 306 in the memory 138. For example, when the intrinsic data 306 is stored as an XML file, the data acquisition module 304 compares XML file metadata, such as a creation date and time associated, with XML files being retrieved from each camera, with similar XML file metadata associated with XML files previously stored in the memory 138. If XML file metadata associated with XML files being retrieved from the left camera 108 and right camera 110 indicates that the creation date and time for those XML files was created after XML files previously stored in the memory 138, the data acquisition module 304 replaces the previously stored XML files with the XML files being retrieved from the left camera 108 and right camera 110.

According to another aspect, a pairing module 308 pairs the left image 116 and the right image 118 to create a stereo image pair 310. The pairing module 308 then stores the stereo image pair 310 and corresponding download history data 312 in the memory 138. The download history data 312 comprises, for example, a time and date that the image data from the left and right cameras 108, 110 included in the stereo image pair 310 were transferred from the image capture device 106 to the processing system 120. According to another aspect, the download history data 312 comprises metadata for each of the left and right cameras 108, 110. Metadata identifies, for example, a camera model, a film type, and left or right camera.

An image-processing module 314 processes the stereo image pair 310 to determine if the left and right images 116, 118 are images of a calibration image 342. For example, the image-processing module 314 employs a pattern recognition algorithm to detect the known geometrical pattern of the calibration image 342 in the stereo image. If the image-processing module 314 determines a particular stereo image pair 310 comprises images of a calibration image 342, a stereo calibration module 316 is executed.

The stereo calibration module 316 is configured to determine stereo calibration data 318 for the image capture device 106. For example, the stereo calibration module 316 determines the pinhole locations for the left and right cameras 108, 110 relative to a common element within a calibration pattern (e.g., calibration image 342) to establish a reference origin for a coordinate system that corresponds to the image capture device 106. In another aspect, the stereo calibration module 316 determines the separation distance between the center of the pinhole locations for the left and right cameras 108, 110 and the angular positioning of each of the cameras in relation to the image capture device 106. The determined pinhole locations for the left and right cameras 108, 110, the separation distance, and the angular position of left and right cameras 108, 110 are referred to collectively as stereo calibration data 318. In one aspect, stereo calibration data is a matrix, either called the essential matrix or the fundamental matrix, comprising both translation and rotation values describing the stereo calibration data 318. The stereo calibration module 316 stores the stereo calibration data 318 in the memory 138. The stereo calibration data 318 is used to triangulate the exact location of user-designated points within a stereo image pair 310.

According to one aspect, stereo calibration is performed just prior to capturing images of a particular object 104 for which measurement information is desired. Environmental conditions, such as temperature and humidity levels, can affect the shape of the image capture device 106 (e.g., material contraction and expansion), and, thus, affect the positioning of the cameras 108, 110 relative to each other. By performing stereo calibration prior to capturing images of a desired object 104, the stereo calibration data 318 can be determined based on the most current positioning of the cameras 108, 110 relative to each other.

According to one aspect, stereo calibration involves using a calibration image (e.g., calibration image 342) to determine the current position of the left and right cameras 108, 110 relative to each other. For example, the image capture device 106 captures left and right images 116, 118 of the calibration image. The size of the individual checker patterns in the image, the focal length of the cameras, principal point, and lens distortion are known parameters. As a result, the separation distance and/or angular position between the left and right cameras can be determined by applying triangulation techniques to selected points in the left and right images. Triangulation is described in more detail below in reference to FIGS. 6A and 6B.

According to another aspect of the stereoscopic measurement system 100, the image-processing module 314 associates the stereo calibration data 318 with a stereo image pair 310 based on the download history data 312. For example, a stereo image pair 310 that has a transfer date and time that is subsequent to the date and time associated with a particular stereo image pair 310 in which the calibration image 342 was detected, is associated with the stereo calibration data 318 determined from that particular stereo image pair 310.

A user interface (UI) module 320 is configured to generate an image management form 322 for the display via the UI 132. In one example, the UI module 320 retrieves the stereo image pair 310 from the memory 138 and allows the user 102 to interact with the left and right images 116, 118 included in the stereo image pair 310 via the image management form 322 on the display 134. The image management form 322 comprises various views that allow a user to display image data, to interact with image data, and to specify points within a stereo image pair 310 for measurement.

Figure 4A:
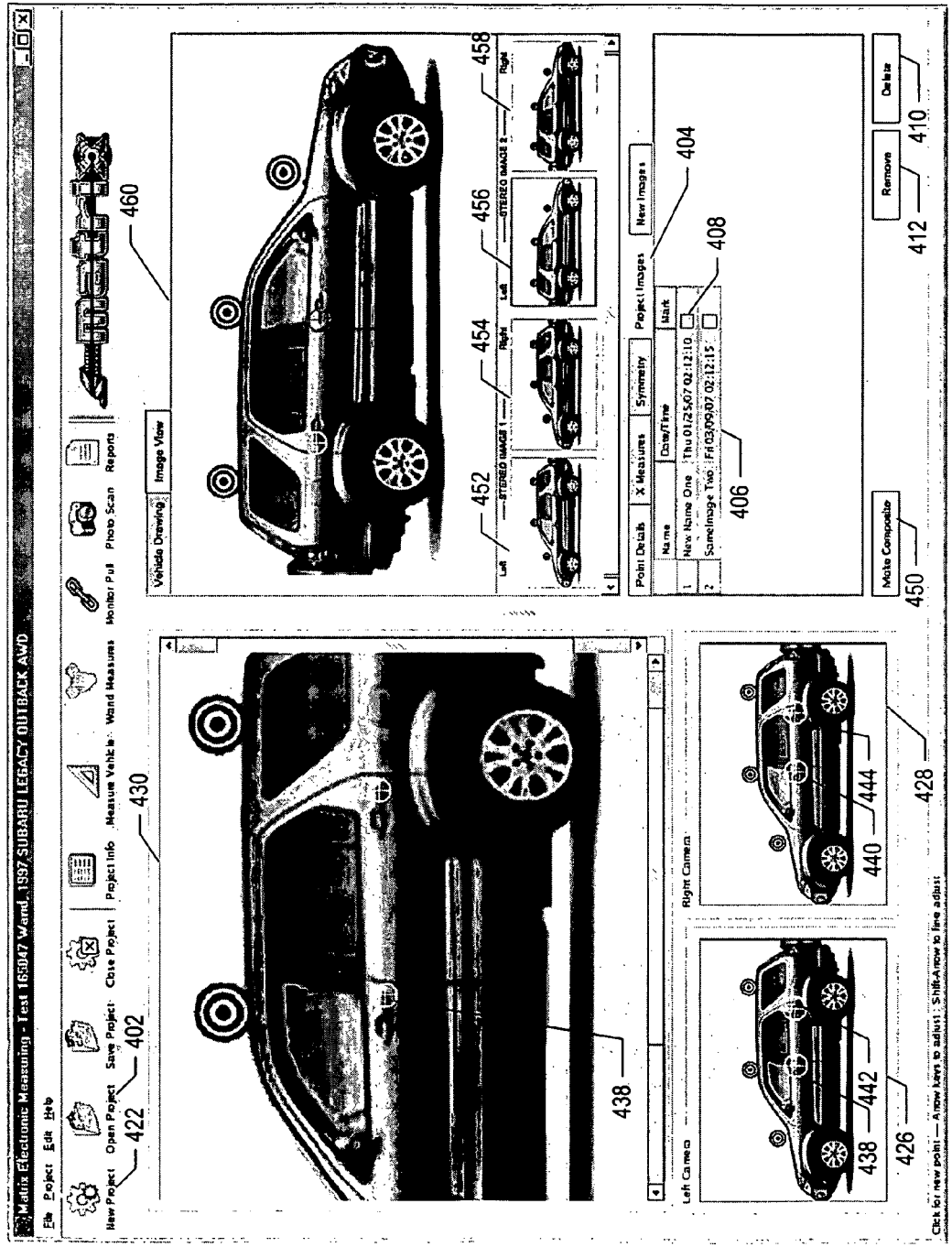
Figure 4B:
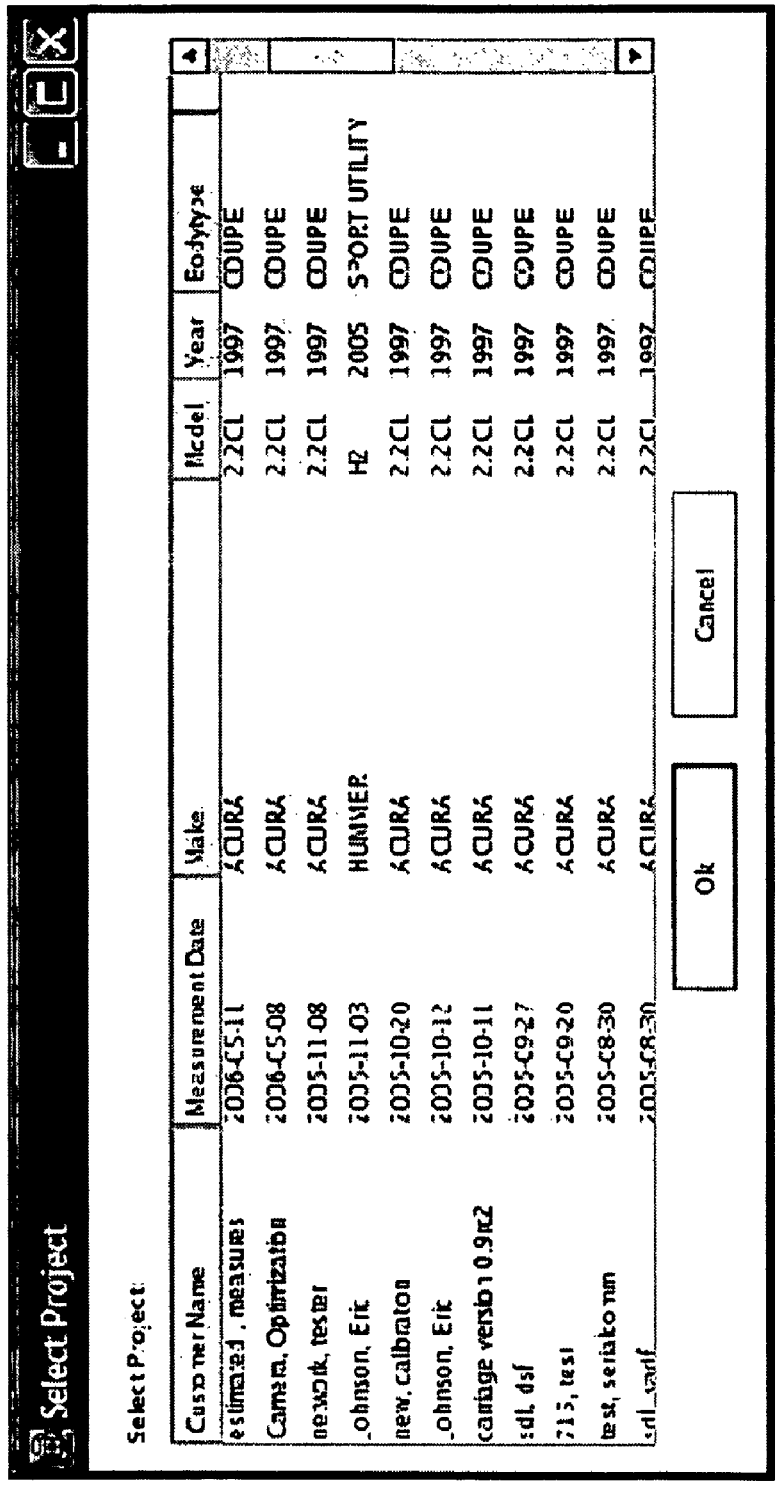

FIGS. 4A-4D depict various screen views of an image management form 322 displayed on the display 134. In one aspect, the user 102 interacts with the image management form 322 depicted in FIG. 4A via an input device (e.g., input device 136) to display an existing project. As used herein, the term "project" refers to a file that comprises one or more stereo image pairs 310. For example, the user 102 uses the input device 136 to select an open project control 402 on the image management form 322 to display a list of existing projects, such as depicted in FIG. 4B. Thereafter, the user 102 selects a particular project from the list of existing projects to open using standard file opening techniques.

According to another aspect, the user 102 uses the input device 136 to interact with the image management form 322 to display a list of stereo images pairs 406 included in the selected project. For example, the user 102 uses the input device 136 to select a project images control 404 to display the list of stereo images pairs 406 included in the selected project.

According to another aspect, the user 102 uses the input device 136 to interact with the image management form 322 to delete one or more stereo images from the list of stereo images pairs 406 included in a project. For example, the user 102 uses the input device 136 to enable or select a check box control 408 adjacent to a stereo image pair 310. Thereafter, the user 102 uses the input device 136 to select, for example, a delete control 410 to permanently delete the selected stereo image pair 310 from memory 138. In another example, the user 102 uses the input device 136 to select, for example, a remove control 412 to remove the selected stereo image pair 310 from the project, but not from the memory 138.

Figure 4C:
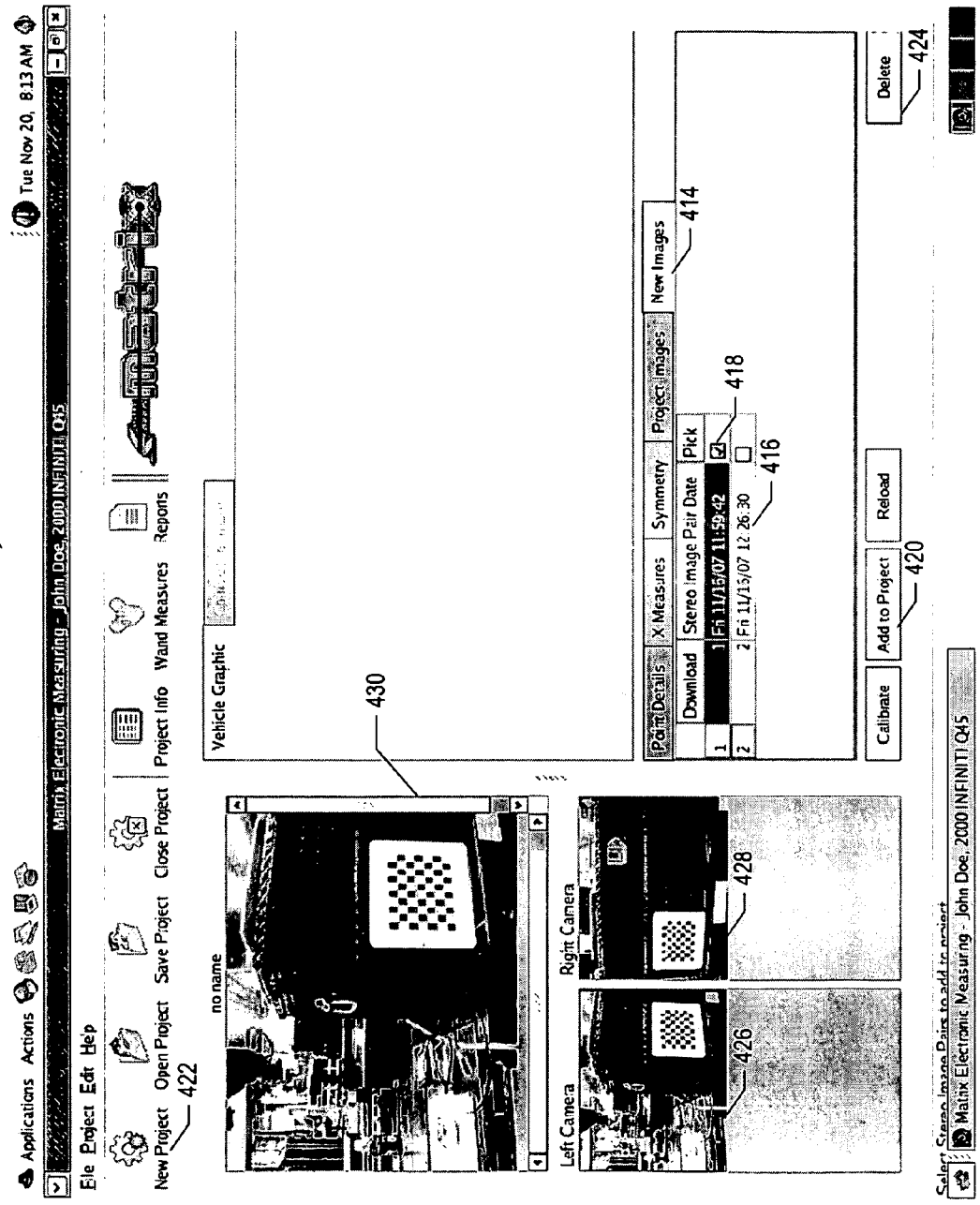

According to another aspect, the user 102 interacts with the image management form 322 to add one or more new stereo images pairs to an existing project. For example, the user 102 uses the input device 136 to select a new images tab 414, such as shown in FIG. 4C, to display a list of new stereo image pairs 416. In one example, the user 102 selects a stereo image pair 310 from the list of new stereo image pairs 416 by using the input device 136 to enable or select a check box 418 adjacent a desired new stereo image pair 310. Thereafter, the user 102 uses the input device 136 to select, for example, an add control 420 to add the selected stereo image pair 310 to the existing project.

According to another aspect, the user 102 interacts with the image management form 322, such as depicted in FIG. 4C, to create a new project. For example, the user 102 uses the input device 136 to select a new project control 422 on the image management form 322 to display the list of new stereo image pairs 416. The user 102 then uses the input device 136 to select one or more stereo image pairs 310 from the list of new stereo image pairs 416 to include in the new project. For example, the user 102 uses the input device 136 to enable or select the check box 418 adjacent the desired new stereo image pair 310. Thereafter, the user 102 uses the input device 136 to select the add control 420 to add the selected stereo image pair 310 to the new project.

According to another aspect, the user 102 interacts with the image management form 322, such as depicted in FIG. 4C, to delete one or more stereo image pairs from the list of new stereo image pairs 416. For example, the user 102 uses the input device 136 to enable or select the check box 418 adjacent to a desired new stereo image pair 310. Thereafter, the user 102 uses the input device 136 to select, for example, a delete control 424 to delete the selected stereo image pair 310 from the list of new stereo images 416.

According to another aspect, the user 102 interacts with the image management form 322 to select a particular stereo image pair 310 within a particular project for viewing. For example, the user 102 uses the input device 136 to enable the check box control 408 (see FIG. 4A) adjacent to a stereo image pair 310 included in the list of stereo images 406 for an existing project. As another example, the user 102 uses the input device 136 to enable the check box 418 (see FIG. 4C) adjacent to a stereo image pair 310 included in the list of new stereo images 416 for a new project.

The UI module 320 generates the selected stereo image pair 310 for display in a left image window 426 and a right image window 428 of the image management form 322 in response to the users' selection. In particular, the left image window 426 displays the left image 116 of the stereo image pair 310 and the right image window 428 displays the right image 118 of the stereo image pair 310.

According to another aspect, the UI module 320 displays the left image 116 or the right image 118 in an active window 430 in response to the user 102 selecting the left image window 426 or the right image window 428. For example, the user 102 uses the input device 136 to select the left image window 426 to display the left image 116 in the active window 430 or to select the right image window 428 to display the right image 118 in the active window 430. Notably, the stereo image pair 310 displayed in FIG. 4C comprises left and right images 116, 118 of a calibration image 342.

Figure 4E:
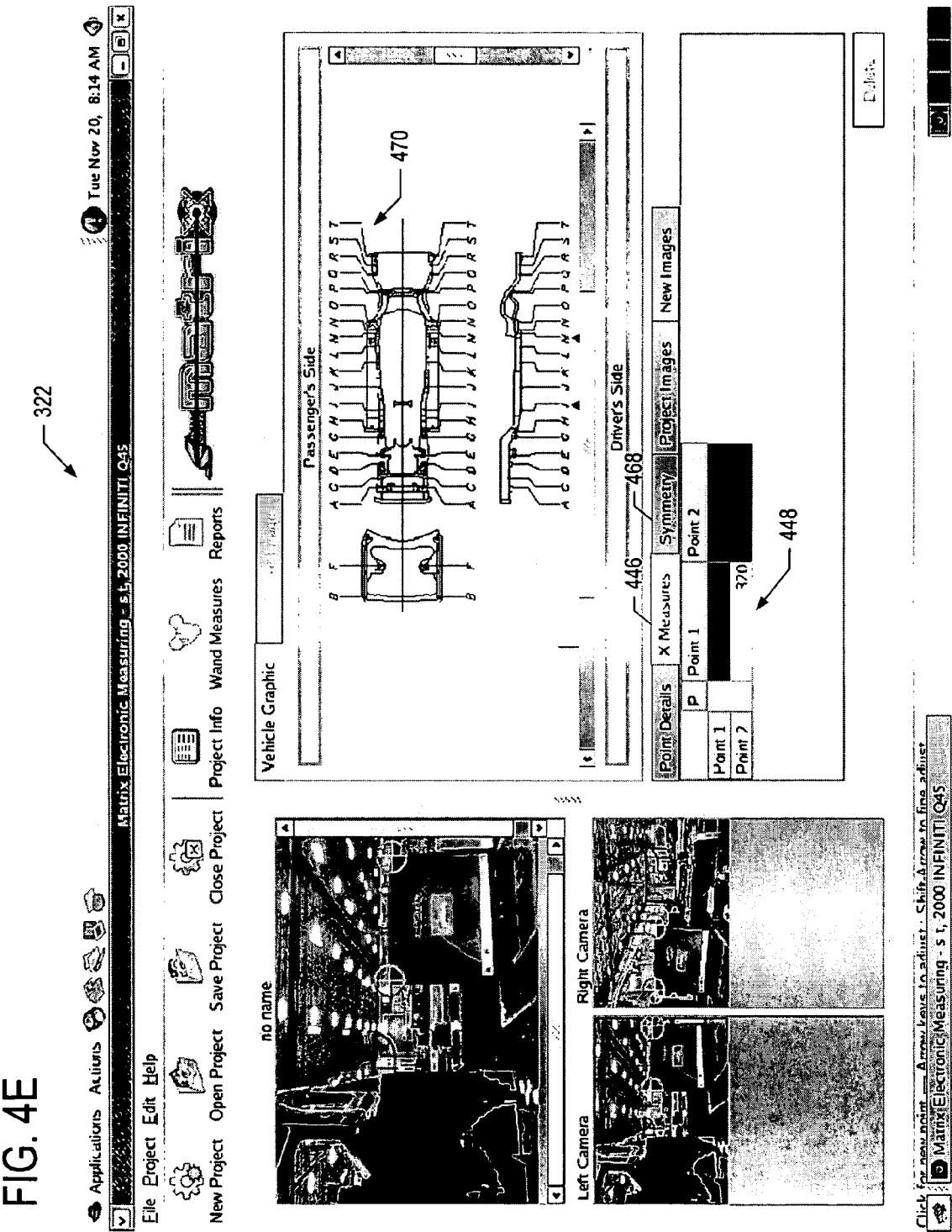

According to another aspect, the user 102 interacts with the image management form 322 to designate one or more measurement points within an image displayed in the active window 430. For example, the user 102 selects either the left image window 426 or the right image window 428 to display the corresponding left image 116 or right image 118 in the active window 430. The user 102 then uses the input device 136 to pan across and/or zoom in and out of the image displayed in the active window 430. In one example, the selected image window (e.g. left image window 426 or right image window 428) that corresponds to the image (e.g. left image 116 or right image 118) displayed in the active window 430 comprises a focus rectangle 434, such as shown in FIG. 4E. The focus rectangle 434 outlines the portion of the image visible in the active window 430. The user 102 can pan the image in the active window 430 by using the scroll bars 436 adjacent to the active window 430. Alternatively, the user 102 pans the image in the active window 430 by dragging the focus rectangle 434 by, for example, positioning a mouse pointer over the focus rectangle 434, pressing and holding the mouse button while the focus rectangle 434 is moved to the desired location.

After the user 102 visually locates the desired measurement point, the user 102 interacts with the image in the active window 430 to select the point. In one example, the user 102 positions a mouse pointer over the desired location and clicks the mouse button to designate the point. In response to a point designation by the user 102, the UI module 320 displays a precision mark 438 at the location on the image displayed in the active window 430 where the user designate the point.

According to another aspect, the user 102 interacts with the image displayed in the active window 430 to fine-tune the location of the designated point. For example, the user uses arrow keys of a keyboard to adjust the location of the point.

In order to obtain precise measurements, the user 102 must designate the same measure points in both the left image 116 and right image 118 of the stereo image pair. Therefore, after designating the desired point in a first image (e.g. left image 116) of the stereo image pair 310, the user 102 selects the other image window (e.g. right image window 428) to display the second image (e.g. right image 118) of the stereo image pair 310 in the active window 430. The user 102 then designates the same point in the second image being displayed in the active window 430. In response to the user's point designation, the UI module 320 displays another precision mark 440 at the location on the second image displayed in the active window 430 where the user designated the same point. In other words, the user 102 selects common points in both of the left and right images 116, 118 of the stereo image pair 310.

Referring back to FIG. 3A, a point selection module 324 is configured to assist a user 102 select the same point in the right image 118 by automatically identifying a range of points in the right image 118 that correspond to the point designated by the user 102 in the left image 116. As described above, left camera 108 and right camera 110 are, for example, pinhole cameras.

Figure 5A:
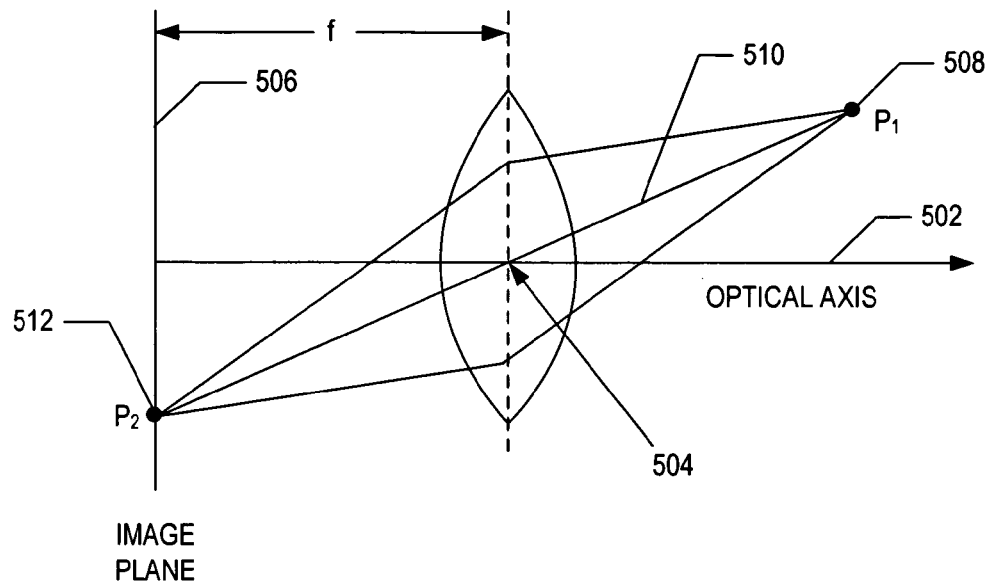
FIG. 5A is a geometric mapping model for a pinhole camera.

FIG. 5A depicts the pinhole model of a camera. An optical axis 502 extends in the view direction of the camera. All projection lines, or homogeneous vectors, of an image pass through a pinhole 504 of the camera. An image plane 506 is where a particular point ($P_1$) 508 in the three dimensional world (X, Y, Z) is projected through the pinhole 504 of the camera. For example, a projection vector 510 or line from point $P_1$ 508 will pass through the pinhole 504 onto the image plane 506 of the camera at a point $P_2$ 512. The distance between the pinhole 504 and the image plane 506 along the optical axis 502 is the focal length, f, of the camera.

Figure 5B:
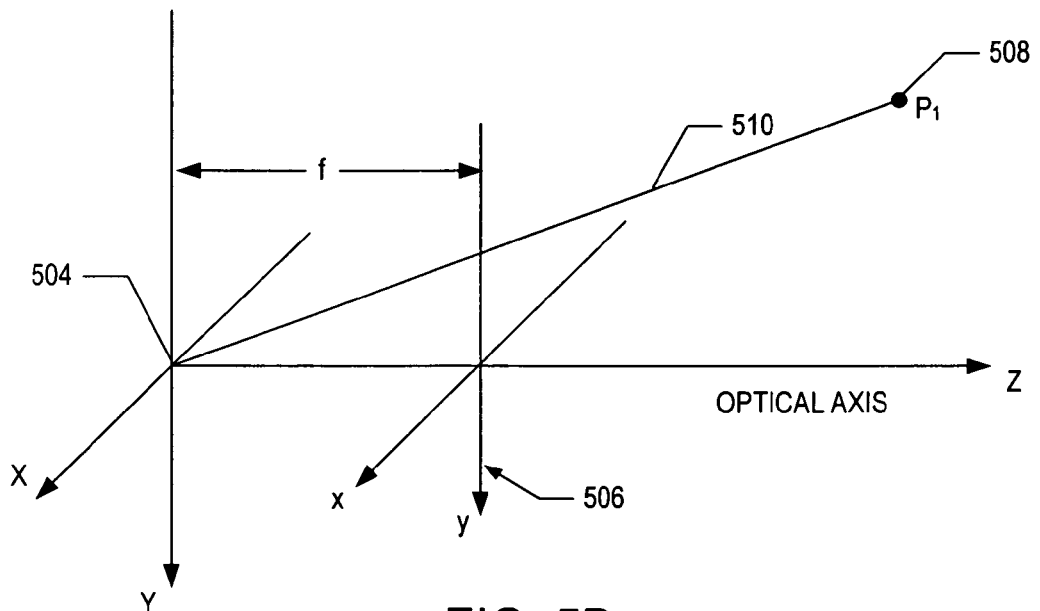
FIG. 5B is a three-dimensional model of the coordinate system for a pinhole camera.

FIG. 5B depicts a three-dimensional coordinate system for the pinhole model used as the basis for single-camera and stereoscopic mathematics. Place the pinhole 504 of the camera (e.g., left camera) at the origin O of the coordinate system, and the image plane 506 parallel to the XY plane of the coordinate system. The relation between the three dimensional world coordinates of point $P_1$ 508 and the coordinates on the image plane (x, y) can be expressed by the following:

$$x = f*X/Z \quad (1);$$

$$y = f*Y/Z \quad (2);$$

where f is the focal length of the lens. Thus, the homogeneous vector 510 defines a point on the image plane of the camera.

Referring back to FIG. 3A, the point selection module 324 defines a range of possible matching points in the right image 118 based on a designated point in the left image 116. According to one aspect, the point selection module 324 uses the series of points defined by a homogeneous vector (e.g., projection vector 510) in FIG. 5B from a designated point in the left image 116 along with intrinsic calibration data and stereo calibration data for the left camera 108 and the right camera 110 to define a range of possible matching points in the right image 118. As described above, intrinsic calibration data comprises focal lengths, principal points, and lens distortions for the left camera 108 and right camera 110 and stereo calibration data includes the relative translation and rotation of the left camera 108 and right camera 110.

According to another aspect, the point selection module 324 generates a selection line 441, such as depicted in FIG. 4D, on the right image 118 when displayed in the active window 430. The selection line 441 corresponds to the range of possible points in the right image 118 that correspond to the point designated in the left image 116.

According to another aspect, the point selection module 324 is configured to automatically identify a point in the right image 118 that corresponds to the point designated by the user in the left image 116. For example, in addition to generating a selection line 441 in the right image 118, the point selection module 324 utilizes a pattern recognition algorithm to identify a point along the selection line 441 that corresponds to the point designated by the user 102 in the left image 116. For example, the point selection module 324 determines the value of each pixel adjacent to the point selected by the user 102 in the left image 116.

Digital images are comprised of pixels, and each pixel has a value that represents a grayscale value or color value. In grayscale images, the pixel value is a single number that represents the brightness of the pixel. The most common pixel format is the byte image, where this number is stored as an 8-bit integer giving a range of possible values from 0 to 255. Typically, a pixel value of zero is taken to be black, and a pixel value of 255 is taken to be white. Values in between make up the different shades of gray. In color images, separate red, green, and blue components must be specified for each pixel (assuming an RGB colorspace). In other words, the pixel value is actually a vector of three numbers. The three different components can be stored as three separate grayscale images known as color planes (one for each of red, green and blue), which can be recombined when displaying or processing.

The point selection module 324 then compares the determined values of the pixels adjacent to the point selected by the user in the left image 116 to identify a particular point that has adjacent pixels with matching values along the selection line 441 in the right image 118. The UI module 320 displays the other precision mark 440 at the location in the right image 118 that corresponds to same point designated in the left image 116.

The user 102 repeats the point selection process to define a second measurement point in each of the right and left images 116, 118. For example, the user 102 selects the left image window 426 to display the left image 116 in the active window 430, and then uses the input device 136 to perform pan and/or zoom operations to locate a desired second measurement point in the left image 116. After the user visually locates the second measurement point, the user 102 uses the input device 136 to designate the location of the second point in the left image 116 as described above in reference to the first measurement point. In response to the user's second point designation, the UI module 320 displays a precision mark 442 at the designated location in the left image 116.

The user 102 then interacts with the image management form 322 to designate the same second measurement points in the right image 118. For example, the user 102 selects the right image window 428 to display the right image 118 in the active window 430. The user 102 uses the input device 136 to designate the location of the same second measurement points in the right image 118.

Alternatively, the user uses the input device 136 to designate the location of the same second measurement points in the right image 118 along another selection line (not shown) generated in the right image 118. The other selection line is generated by the point selection module 324 and corresponds to the range of possible points in the right image 118 that correspond to the second measurement point. In another aspect, the user 102 relies on the point selection module 324 to automatically locate the same second measurement point in the right image 118. The UI module 320 displays a precision mark 444 at the location in the right image 118 that corresponds to same point designated in the left image 116.

A stereo point module 326 uses triangulation to define a stereo point in the virtual three-dimensional coordinate system of the image capture device 106 based on the common points designated in both the left image 116 and right image 118 of the stereo image pair 310. In other words, a stereo point or three dimensional position of a designated point can be reconstructed from the perspective projections of that point on the image planes of the left and right cameras 108, 110 once the relative position and orientation of the two cameras are known. The stereo point corresponds to the x, y, z coordinate values of the common designated point in the left and right images 116, 118 as determined from triangulation.

Figure 6A:
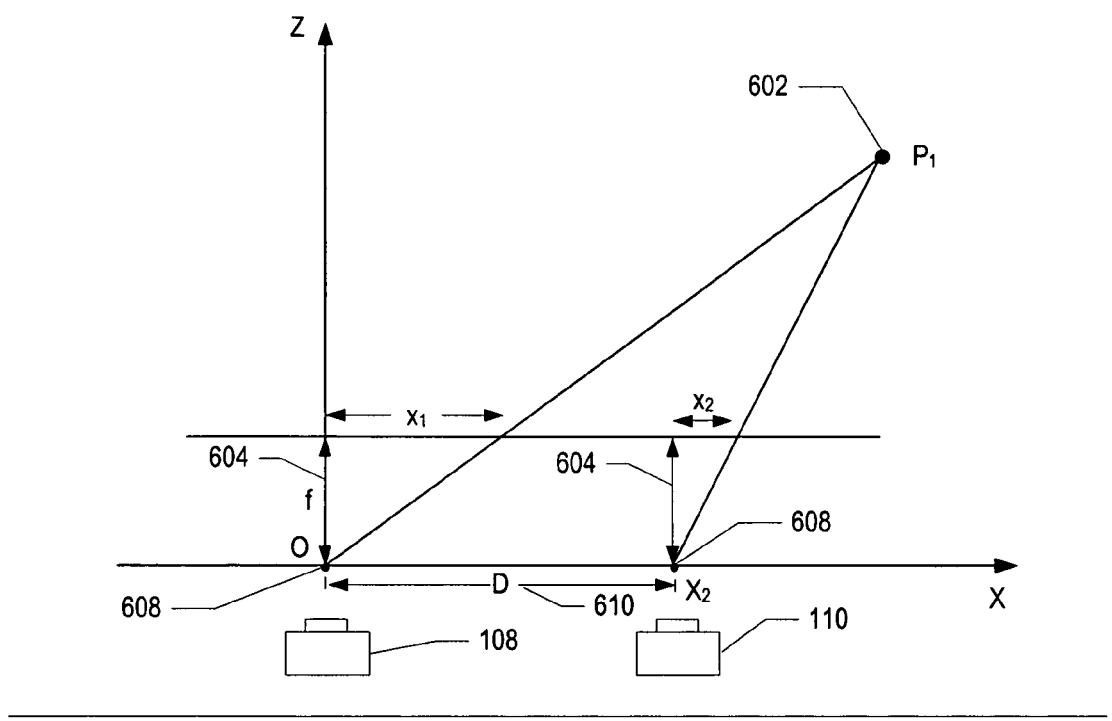
FIG. 6A-6B are triangulation models for determining the location of a point in a coordinates system of an image capture device.

FIG. 6A depicts an epipolar triangulation model for determining the location of a point $P_1$ 602 in a coordinate system of the image capture device 106. The left camera 108 and the right camera 110 are each pinhole cameras with parallel optical axes. For purposes of illustration assume that the left camera 108 and right camera 110 each have the same focal length F 604. Further, assume that the center of left camera 108 is located at $X_1$ 606 along the X-axis and that the center of the right camera 110 is located at $X_2$ 608 along the X-axis. The distance (D) 610 between the centers of each lens (i.e., center of pinholes) is equal to the difference between $X_1$ 606 and $X_2$ 608. In this example, the optical axis of each camera is in the XZ plane and the XY plane is parallel to the image plane of both the left and right cameras 108, 110. Assume that the X axis is the baseline and the origin, O, of the coordinates system (X, Y, Z) of the image capture device 106 is located at the lens center (e.g., pinhole) of the left camera 108. The three dimensional coordinates of the point $P_1$ 602 can be determined from the following algorithms:

Define a scaling factor as:

$$S=D/|x1-x2| \qquad (3).$$

Then, the X, Y, Z coordinates can be determined as follows:

$$z=f*S \qquad (4);$$

$$X=x1*S \qquad (5); \text{ and}$$

$$Y=y1*S=y2*S \qquad (6).$$

Figure 6B:
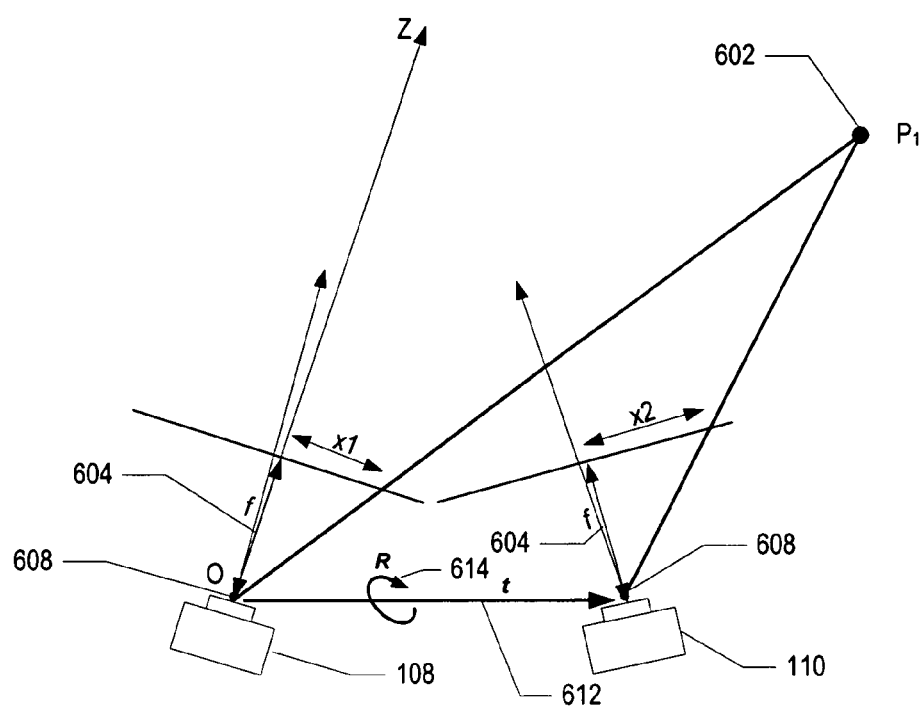

FIG. 6B depicts another epipolar triangulation model for determining the location of a point $P_1$ 602 in a coordinate system of the image capture device 106. The left camera 108 and the right camera 110 are each pinhole cameras angled with their optical axes toed in toward each other. For purposes of illustration assume that the left camera 108 and right camera 110 each have the same focal length F 604. The distance between the origins of each camera's pinhole model is represented by translation vector t. Any rotation, including the toe-in of the optical axes, can be represented by a rotation matrix R. A mapping of the left and right camera coordinate systems will bind projection vectors representing point P1 into one overall coordinate system. One such mapping is the essential matrix, E, resulting from the product of the skew-symmetric matrix of vector t, as indicated by reference character 612, and the rotation matrix R, as indicated by reference character 614. Projection vectors x1 and x2 are now related in a single coordinate frame as:

$$x1*E*x2=0 \qquad (7).$$

Coordinates (X, Y, and Z) of point P1 are derived from simple triangulation of these projection vectors within the combined coordinate frame.

A cross measure module 328 calculates the distance between two or more stereo points defined by the stereo point module 326. In one example, the cross measure module 328 calculates the distance between two or more stereo points in response to a user selecting a measure control 446, such as shown in FIG. 4E. The UI module 320 displays the calculated distance in a measurement table 448.

A composite module 330 is configured to combine or stitch two stereo image pairs 310 into a composite stereo image pair 332. The composite stereo image pair 332 comprises two stereo image pairs 310 in which there is some overlap between the right and left images 116, 118 included in each of the two stereo image pairs 310. By combining two such stereo image pairs 310, measurements can be obtained between a first point in the left and right images 116, 118 of a first stereo image pair image and a second point in the left and right images 116, 118 of a second stereo image pair. In particular, measurement can be obtained between the non-overlapping portions of the right and left images 116, 118 included in the two stereo image pairs 310.

According to one aspect, the user 102 defines composite points in each of two stereo image pairs 310 and overlays the two stereo image pairs 310 based on the composite points to create the composite stereo image pair 332. For example, the users uses the point selection techniques described above to select the same three non-co-linear and uniquely identifiable reference points in both of the stereo image pairs 310. The composite module 330 overlays to the two stereo image pairs 310 such that the three non-co-linear and uniquely identifiable reference points match to create the composite stereo image pair 332 in response to the user 102 selecting a create composite control 450, such as shown in FIG. 4A. The composite stereo image pair 332 comprises a composite left image and a composite right image. The composite module 330 then stores the composite stereo image pair 332 in the memory 138.

Figure 7A:
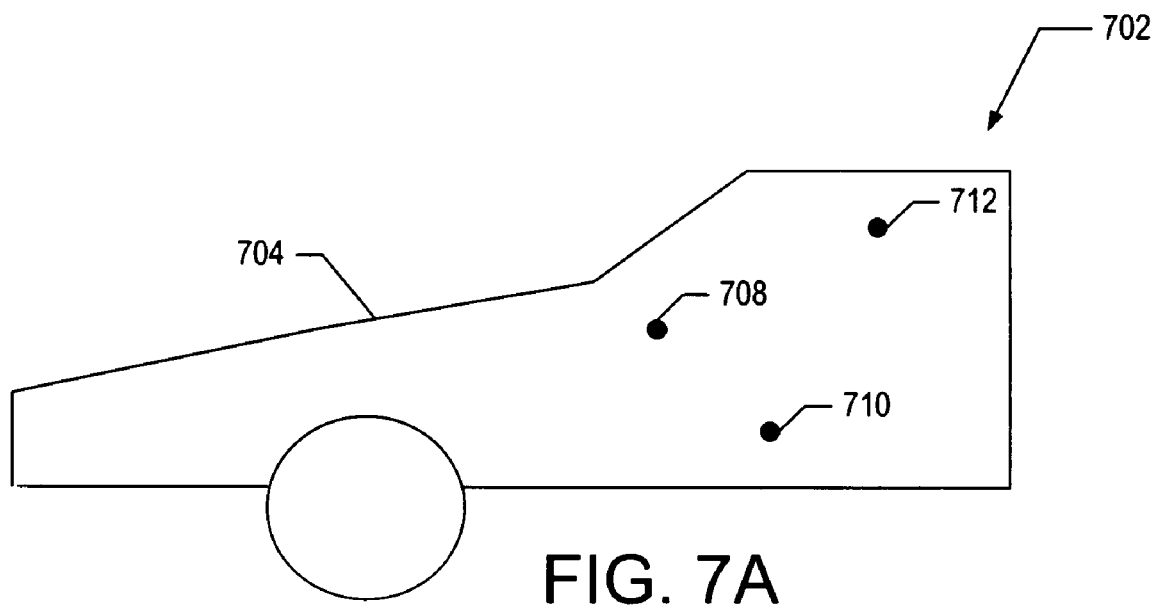
FIGS. 7A-7D are illustrations of an overlay process for creating a composite stereo image pair from two stereo image pairs.
Figure 7B:
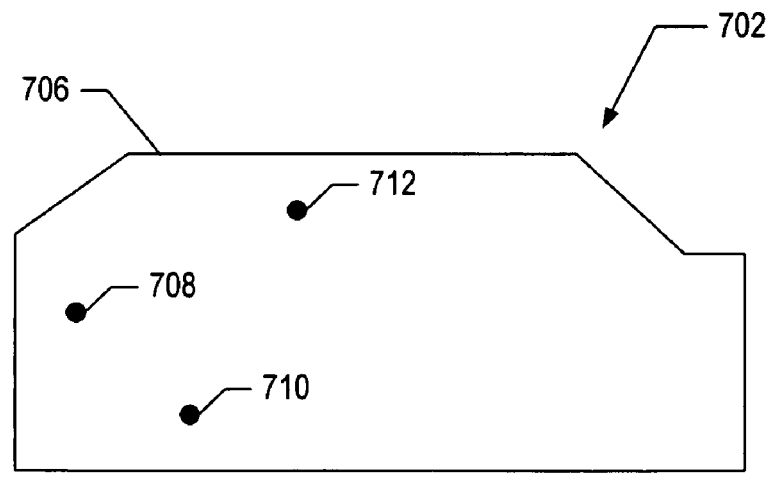
Figure 7C:
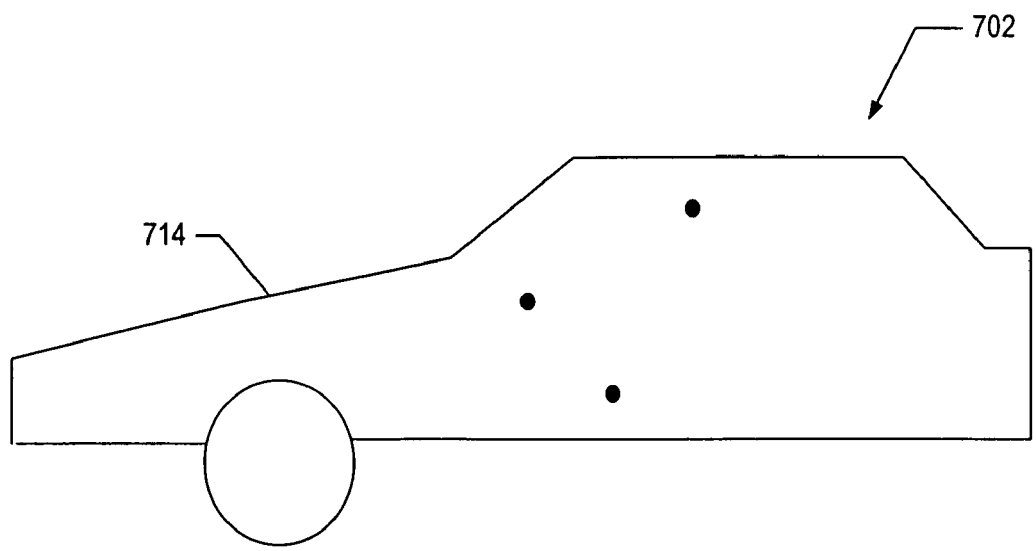

FIGS. 7A-7C depict an overlay process for creating a composite stereo image pair 332 based on two stereo images of a vehicle 702. Although the overlay process involves combining both left and right images from two stereo pairs, for purposes of illustration the overlay process is described in reference to combining the left images 116 of two stereo pairs 310. FIG. 7A depicts a first left image 704 of a first stereo image pair that corresponds to a front section of the vehicle 702.

FIG. 7B depicts a second left image 706 of a second stereo image pair 310 that corresponds to the mid section of the vehicle 702. As described above, the user 102 uses the point selection techniques described above to select the same three non-co-linear and uniquely identifiable reference points in both the first and second left images. In this example, reference points 708, 710, 712 are selected in both the first and second left images 704, 706.

Figure 7D:
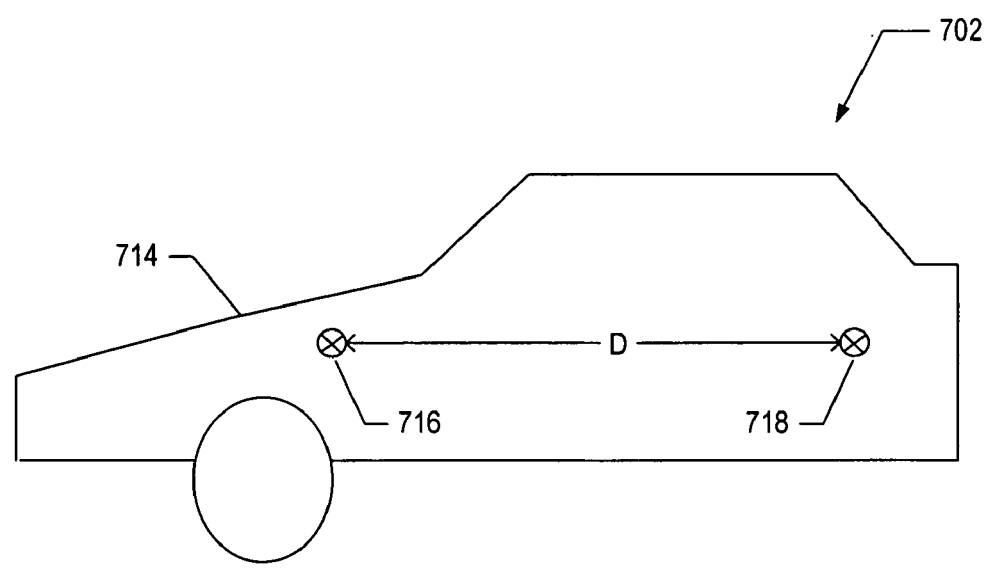

FIG. 7C depicts an overlay of the first left image pair 704 and second left image 706 such that reference points 708, 710, 712 match to create a composite left image 714. As shown in FIG. 7D, a first measurement point 716 can be selected in the front section of the vehicle 702 and a second measurement point 718 can be selected in the mid-section of the vehicle 702 via the composite left image 714.

Notably, a same overlay process is used to create a composite right image based on a first right image of the first stereo image pair the second right image of the second stereo image pair.

According to another aspect, the user 102 interacts with the image management form 322 to add the composite stereo image pair 332 to an existing project. For example, the user 102 uses the input device 136 to select, for example, the add control 420 (see FIG. 4C) to add the composite stereo image pair 332 to the existing project.

According to another aspect, the user 102 interacts with the image management form 322 to select a composite stereo image pair 332 to display the left images and right images 116, 118 of each stereo pair 310 included in the composite stereo image pair 332. In one example, the user 102 selects a composite stereo image pair 332 for viewing by using the input device 136 to enable or select a check box (not shown) adjacent to a desired composite stereo image pair 332. The UI module 320 displays images from the left and right images 116, 118 for each of the stereo images in image windows 452-458 in response to the user selecting the composite stereo image pair 332.

According to another aspect, the user 102 uses the input device 136 to select one of image windows 452-458 to display the corresponding image in the active window 430.

Referring back to FIG. 3A, the measurement application 302 is configured to retrieve information from a measurement database 334 that comprises stereo point data 336 for specific defined points on one or more objects 104. In one example, the measurement database 334 comprises stereo point data 336 for defined stereo points, or reference stereo points, along a vehicle body for a specific type of vehicle when the body is not damaged.

By comparing stereo point data from the measurement database 334 to stereo points generated based on user-designated points in stereo images of a vehicle of the same type with body damage, a precise assessment of the amount of damage to the vehicle can be determined. For example, the distance between a reference stereo point on an undamaged vehicle can be compared to stereo points defined based on corresponding user-designated points in stereo images of a damaged vehicle. The distance between the reference stereo point and one or more defined stereo points can be measured to determine an amount of damage to the vehicle.

As another example, by comparing stereo point data 336 from the measurement database 334 to stereo points generated based on user-designated points in stereo images of an undamaged vehicle, deviations in the body of the undamaged vehicle can be identified. As a result, the measurement system 100 can be used to verify that products, such as vehicles, are being manufactured within desired tolerances. Although the measurement database 334 is depicted as being external the processing system 120, it is contemplated that the measurement database 334 may be located on the processing system.

A symmetry module 338 is configured to determine if there are symmetry deviations between selected points on an object. According to one aspect, using the techniques described above, the user 102 opens a new project or an existing project that comprises at least two stereo image pairs that show opposing sides of an object. The user 102 then uses the point selection techniques described above to define a set of stereo points on each opposing side of the object 104.

Figure 4F:
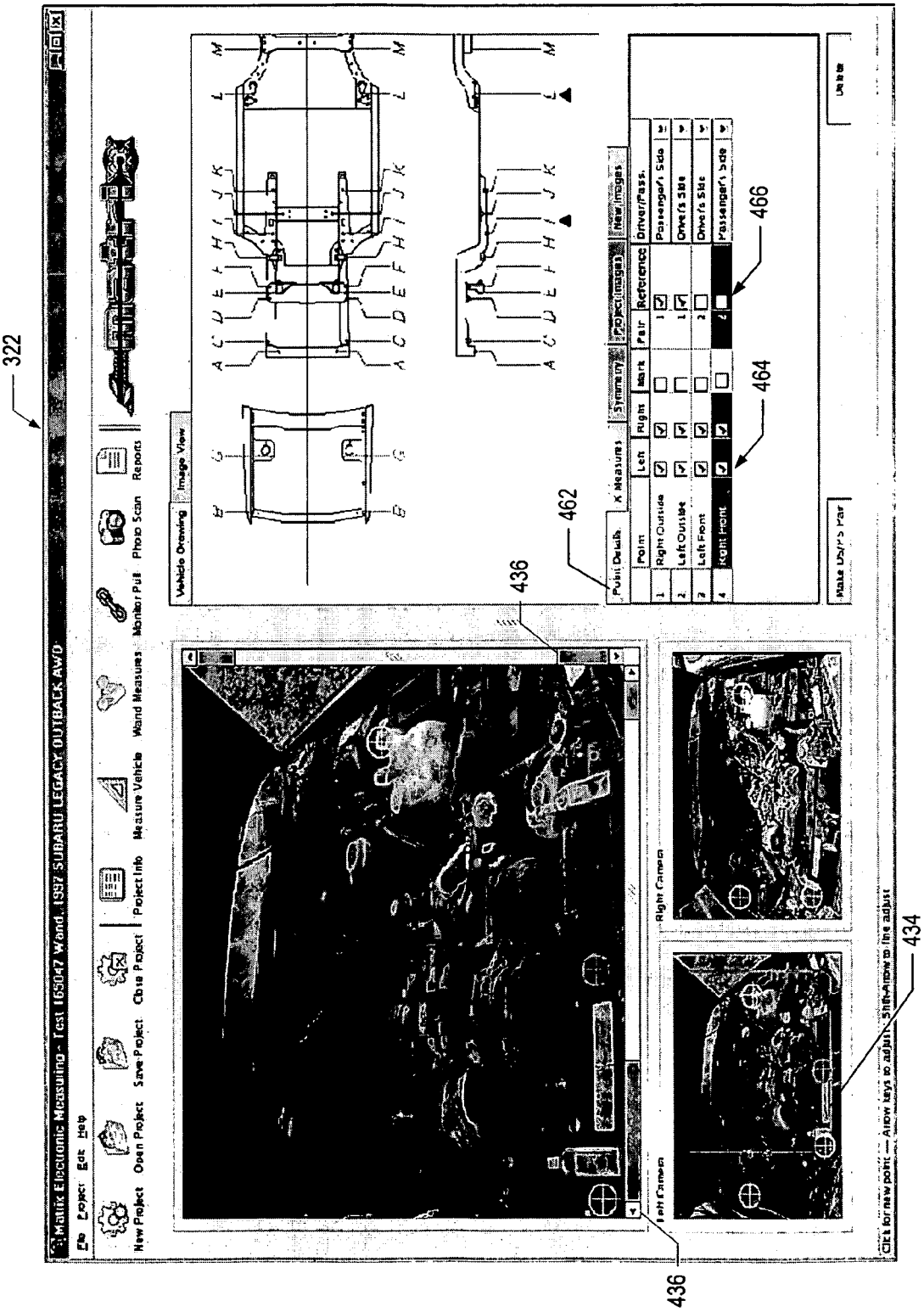

For example, if the object 104 is a vehicle, the user 102 selects a set of points (e.g., first and second points) in a first stereo image pair 310 comprising left and right images 116, 118 of a passenger side of the vehicle. The user 102 then selects another set of points (e.g., first and second points) in a second stereo image pair 310 comprising left and right images 116, 118 of a driver side of the vehicle. The user interacts with the image management form 322 to define point details for a selected set of points. For example, the user 102 uses the input device 136 to select, for example, a point detail control 462 to display a point detail table 464, such as depicted in FIG. 4F. The user 102 then designates one set of points as a reference set by using the input device 136 to enable an adjacent check box control 466.

Figure 3E:
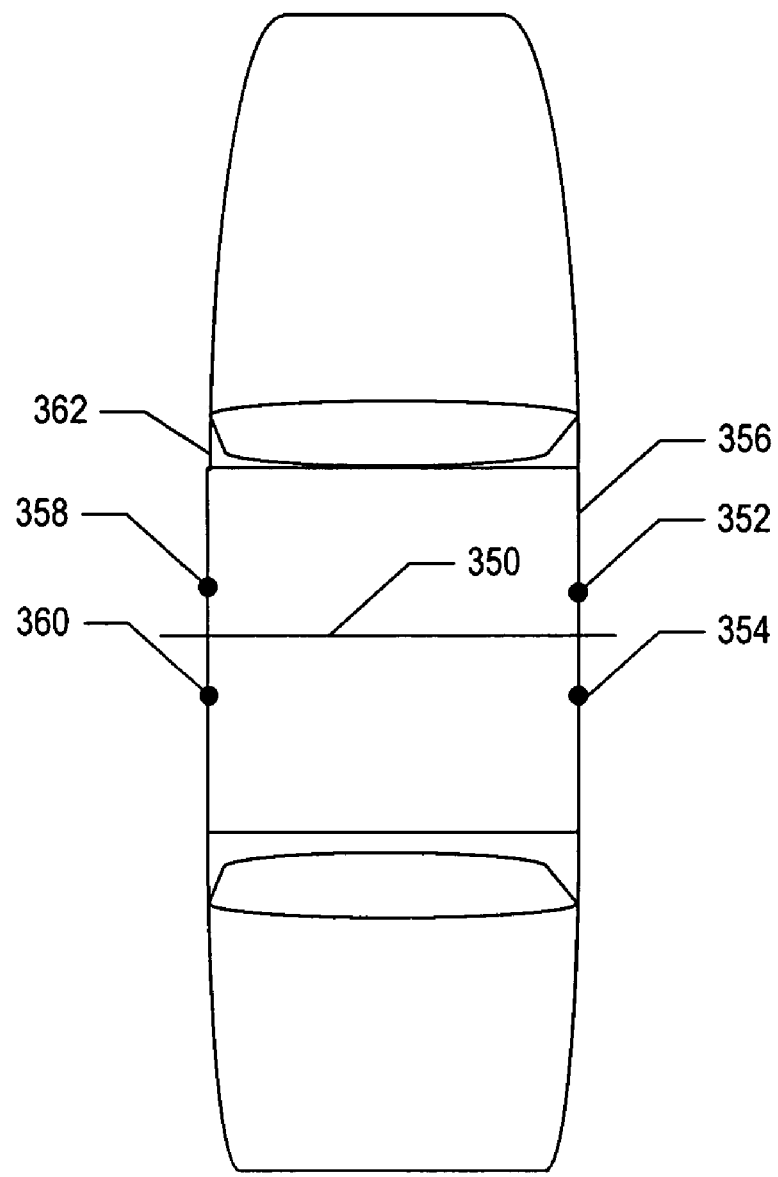
FIG. 3E is an image of a vehicle with a central reference plane between selected points.

According to one aspect, the symmetry module 338 is configured to define a central reference plane 350 based on the designated reference set in response to the user selecting a symmetry control 468, such as depicted in FIG. 4C. As an example, FIG. 3E depicts a top view of a vehicle having a first point and a second point 354 selected on the passenger side 356 a corresponding first point 358 and a corresponding second point 360 point selected on a driver side 362. Assuming the user designates the first point 352 and second point 354 selected on the passenger side 356 as the reference set, the symmetry module 338 defines the central reference plane 350 between the first point 352 and the second point 354.

According to one aspect, symmetry deviations are determined and displayed as deviation values via the image management form. In one example, the determined deviation values are displayed as two values, one for distance from the center plane (Y) and one for the combined X and Z values.

Figure 3F:
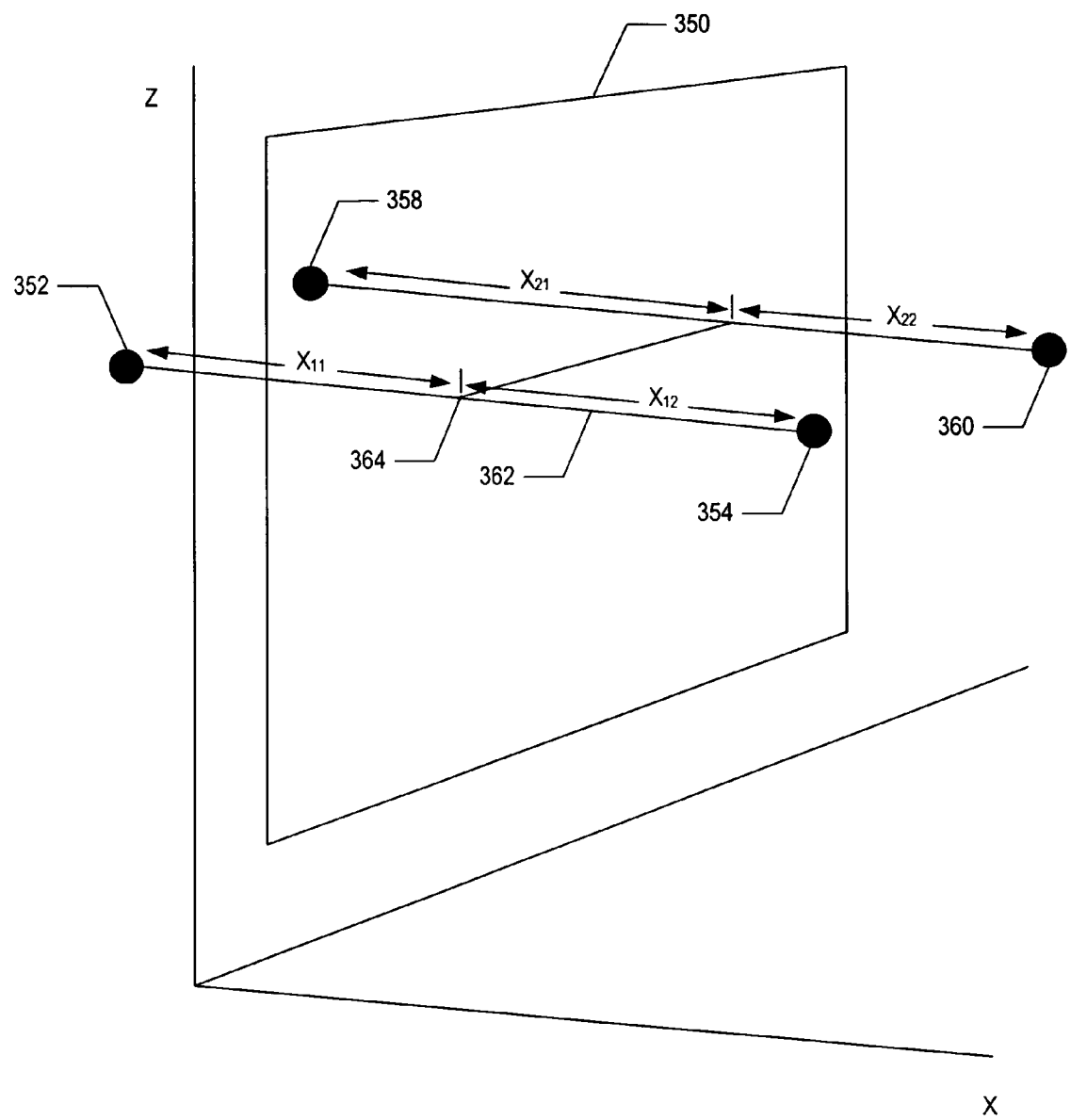
FIG. 3F is a geometric model for determining symmetry between selected points on an image.

FIG. 3F depicts a geometrical model for determining symmetry between a first set of points on a first side of an object and a second set of points on a second side. For purposes of illustration, the geometrical model will be described in reference to the example shown in FIG. 3E. A vector 362 is defined between the first and second points 352, 354 and a midpoint 364 of the vector 362 is determined. The center reference plane 350 is defined as the plane that passes though the midpoint 364 and that is perpendicular to the vector 362. The midpoint 364 is also defined as the origin of an X, Y, Z coordinate system.

The distance $X_{11}$ from the first point 352 to a perpendicular point on the reference plane 350 is determined and the distance $X_{12}$ from the second point 354 to the perpendicular point on the reference plane 350 is determined. The distance $X_{21}$ from the corresponding first point 358 to a perpendicular point on the reference plane 350 is determined and the distance $X_{22}$ from the corresponding second point 360 to the perpendicular point on the reference plane 350 is determined. Corresponding distances are compared to determine symmetry deviation values. For example, distance $X_{11}$ is compared to distance $X_{21}$. According to one aspect, the measurement application 130 defines the difference in distances as the X deviation error. If neither point is a reference point, the measurement application 130 divides the X deviation error. If at least one point is a reference point, the measurement application 130 assigns the X deviation error to the non-reference point.

According to another aspect, the measurement application 130 determines the points at which the first point 352 and second point 354 projects into the reference plane 350, and determines the points at which the corresponding first point 358 and second point 360 projects into the reference plane 350. The measurement application 130 determines a combined YZ error of the first and second points 352, 354 as a function of the distance between the projected points from the passenger side 356. Similarly, the measurement application 130 determines the combined YZ error of the corresponding first and second points 358, 360 as a function of the distance between the projected points from the driver side 362. If neither point is a reference point, the measurement application 130 splits the YZ error. Otherwise, the measurement application 130 assigns the YZ error to the non-reference point.

According to another aspect, a reporting module 340 creates customized reports. In one example, the reports include the results of the calculations of cross measures based on user-designated points. The results can be displayed in a tabular format on the image management form 334. In another example, the reports comprise deviations from symmetry or comparative measurements based on stereo point data retrieved from the measurement database 330. In another example, images and/or diagrams are incorporated into reports. For example, if the object 104 being analyzed is a vehicle, the reports may include images or diagrams 470 of the vehicle with measure points identified and labeled, such as depicted in FIG. 4E. Notably, reports can be generated for display and can optionally be printed and/or saved to disk According to another embodiment, the measurement application 130 is executed on a server computer, and reports and/or image data can be communicated to remote computers, such as personal computers, laptops, personal digital assistants, and any other computing device via a communication network, such as the Internet, an Intranet, or any other suitable communication network.

Computer readable media 370 may include volatile media, nonvolatile media, removable media and non-removable media, may also be any available medium that may be accessed by the general purpose computing device. By way of example and not limitation, computer readable media 370 may include computer storage media and communication media. Computer storage media may further include volatile, nonvolatile, removable and non-removable media implemented in any method or technology for storage of information such as computer readable instructions, data structures, program modules or other data. Communication media may typically embody computer readable instructions, data structures, program modules, or other data in a modulated data signal, such as a carrier wave or other transport mechanism and include any information delivery media. Those skilled in the art will be familiar with the modulated data signal, which may have one or more of characteristics set or changed in such a manner that permits information to be encoded in the signal. Wired media, such as a wired network or direct-wired connection, and wireless media, such as acoustic, radio frequency, infrared, and other wireless media contemplated by the stereoscopic measurement system 100, are examples of communication media discussed above. Combinations of any of the above media are also included within the scope of computer readable media discussed above.

Figure 8:
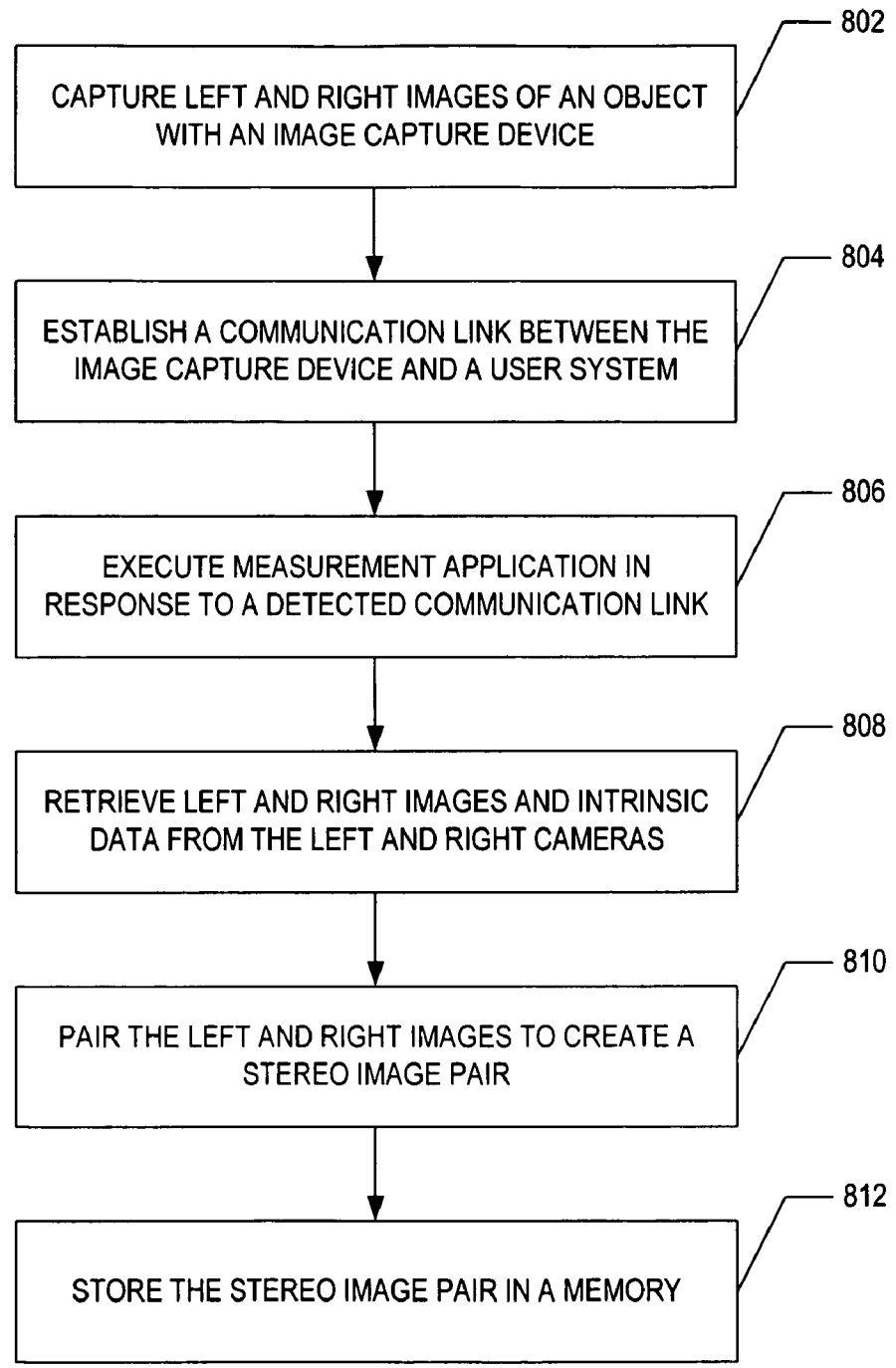
FIG. 8 is a flow chart illustrating a stereo image acquisition method according to one aspect of the stereoscopic measurement system.

FIG. 8 illustrates a stereo image acquisition method according to an aspect of the measurement system. At 802, the image capture device 106 captures the left image 116 and right image 118 of the object 104 via the left camera 108 and the right camera 110, respectively. A communication link is established between the processing system 120 and the image capture device 106 at 804. As described above, the communication link can be established via a wired connection 128 or the combination of a wireless transmitter 124 and wireless receiver 126.

At 806, the measurement application 130 is executed in response to the established communication link between the processing system 120 and the image capture device 106. The measurement application 130 retrieves the left and right images 116, 118 and downloads intrinsic data from the left and right cameras at 808. At 810, the measurement application 130 pairs the left image 116 and the right image 118 to create the stereo image pair 310. The measurement application 130 stores the stereo image pair 310 and corresponding download history data 312 in the memory 138 at 812. As described above, the download history data 312 comprises, for example, a time and date that the left image 116 and the right image 118 of the stereo image pair 310 were transferred from the image capture device 106 to the processing system 120.

Figure 9:
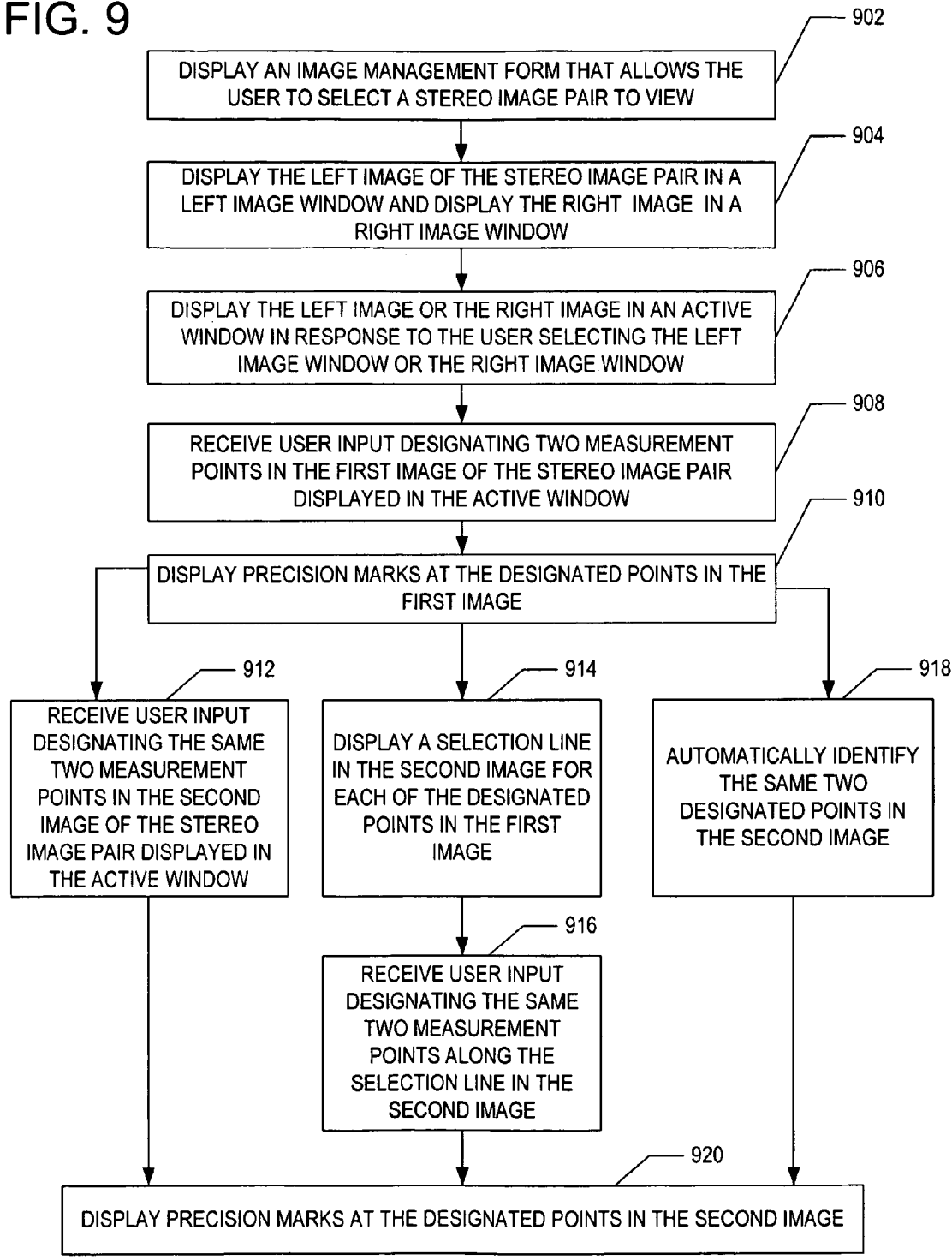
FIG. 9 is a flow chart illustrating a point measurement method within a stereo image pair according to one aspect of the stereoscopic measurement system.

FIG. 9 illustrates a point measurement method within a stereo image pair 310 according to one aspect of the measurement system 100. At 902, the measurement application 130 displays an image management form 322 on the display 134 that allows a user to select a stereo image pair 310 for viewing. The left image 116 and right image 118 of the selected stereo image pair 310 in the left image window 426 and the right image window 428 at 904. At 906, the left image 116 or the right image 118 is displayed in the active window 430 in response to the user 102 selecting the left image window 426 or the right image window 428. As described above, the user 102 uses the input device 136 to select the left image window 426 to display the left image 116 in the active window 430 or to select the right image window 428 to display the right image 118 in the active window 430.

At 908, the user 102 interacts with the image management form 322 to designate two measurement points within a first image of the stereo image pair that is displayed in the active window 430. For example, after the user 102 visually locates the desired point, the user 102 positions a mouse pointer over the desired location in the first image and clicks the mouse button to designate two measurement points in the first image. Precision marks (e.g., precision marks 438, 442) are displayed at the locations in the first image displayed in the active window 430 where the user designated the point at 910.

At 912, the user 102 interacts with the image management form 322 via the input device 136 to designate the same measurement points within the second image of the stereo image pair 310 displayed in the active window 430. Optionally at 914, the measurement application 130 displays a selection line that defines a range of possible matching points in the second image 116 based on each of the user designated points in the first image. At 916, the user 102 interacts with the image management form 322 to designate the same measurement points along the selection lines within the second image of the stereo image pair 310 displayed in the active window 430.

As another option, at step 918, the measurement application 130 automatically identifies points in the second image that corresponds to the points designated by the user in the first image. As describe above, in addition to generating selection lines 438 in the second image 116, the measurement application utilizes a pattern recognition algorithm to identify a point along the selection lines that correspond to the points designated by the user 102 in the first image. At 920, precision marks (e.g., precision marks 440, 444) are displayed at locations in the second image that correspond where the user 102 designated measurement points in the second image at 912 or 916, or where the measurement application 130 automatically identified the matching measuring points in the second image at 918.

Figure 10:
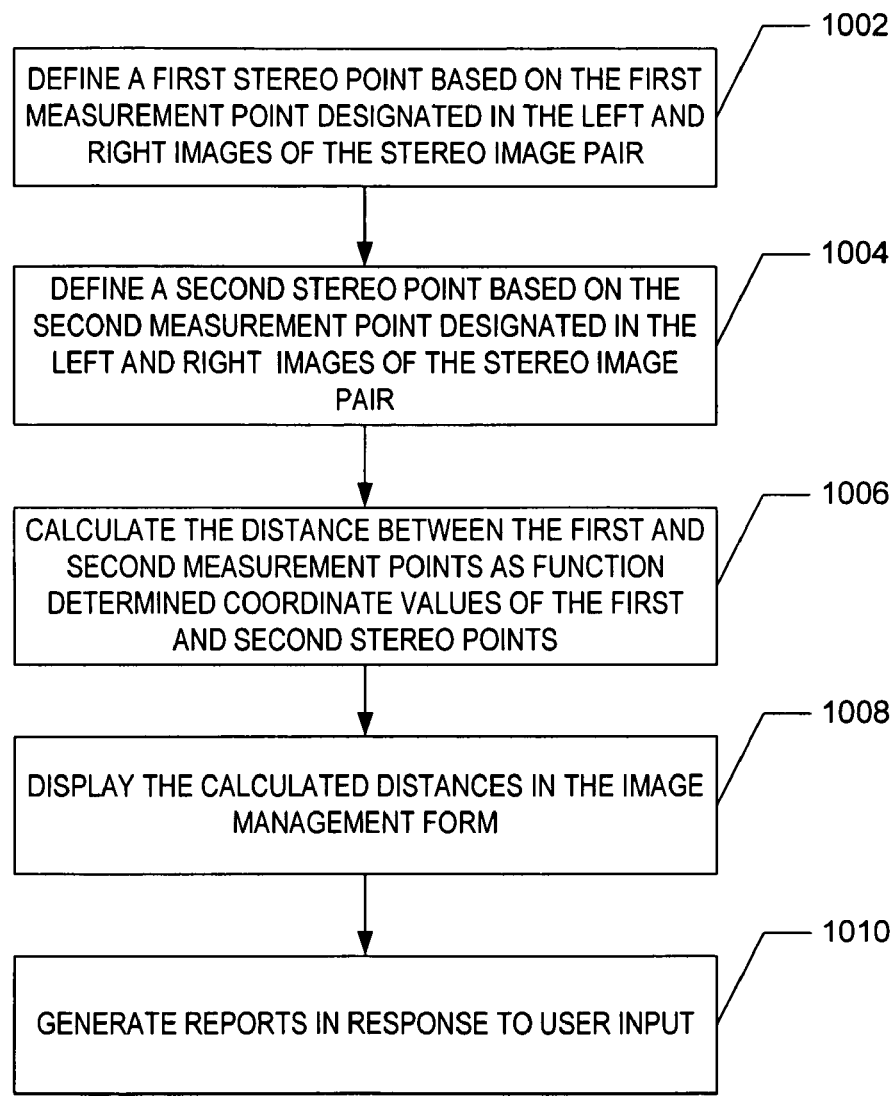
FIG. 10 is a flow chart illustrating a method for calculating and reporting measurements between designated measurement points in a stereo image pair according to one aspect of the stereoscopic measurement system.

FIG. 10 illustrates a method for calculating and reporting measurements between designated measurement points according to one aspect of the measurement system 100. At 1002, the measurement application 130 defines a first stereo point for the first measurement point designated in the left image 116 and the right image 118. The measurement application 130 defines a second stereo point for the second measurement point designated in the left image 116 and the right image 118 at 1004. As described above, each stereo point corresponds to the x, y, z coordinates of the common designated point in the left and right images 116, 118 as determined from triangulation. The distance between the first and second measurement points is calculated as function of the coordinate values of the first and second stereo points at step 1006. At step 1008, the calculated distances are displayed to the user via the image management form. At step 1010, the reports are generated in response to input received from a user via the image management form.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for obtaining measurements of an object, the system comprising:
a portable image capture device to capture first and second images of a plurality of objects and to transmit the first and second images; and a processing system comprising a measurement application executable on the processing system, the measurement application comprising:
    a pairing module to store a stereo image pair in a memory for each of the plurality of objects, the stereo image pair comprising first and second images of a particular object that were simultaneously captured;
    a user interface (UI) module to generate a list of stereo image pairs for display, to generate corresponding first and second images of a selected one of the list of stereo image pairs for display, and to receive:
        a first user input designating a first set of points in a first stereo image pair and a second user input designating a second set of points in a second stereo image pair, wherein the first stereo image pair comprises the first image and the second image of a portion of the particular object, and wherein the second stereo image pair comprises another first image and another second image of an opposite portion of the particular object; and
    a symmetry module configured to:
        define a central reference plane between the first set of points in the first stereo image pair and the second set of points in the second stereo image pair; and
        calculate symmetry deviations between the first set of points and the second set of points as a function of the defined central reference plane.

2. The system of claim 1 wherein the portable image capture device comprises a first camera to capture each of the first images and a second camera to capture each of the second images, and wherein the pairing module is further configured to store download history data for each stereo image pair in the memory, the download history data comprising metadata and intrinsic calibration data for each of the first and second cameras and a time and date that the corresponding first and second images comprised in each stereo image pair were received from the portable image capture device.

3. The system of claim 2 wherein the portable image capture device further comprises:
    a monitor to display the first and the second images of each of the plurality of objects being captured; and
    a switch to control the first and second cameras to capture the first and second images of each object simultaneously.

4. The system of claim 2 wherein the measurement application further comprises:
    an image-processing module to process each stereo image pair stored in the memory to determine if the first and second images of the particular object are images of a calibration pattern; and
    a stereo calibration module to determine stereo calibration data for the portable image capture device when the first and second images of the particular object are of the calibration pattern, the stereo calibration data comprising location information for the first camera relative to the second camera in a coordinate system of the portable image capture device, and wherein the stereo calibration module is configured to store the stereo calibration data in the memory.

5. The system of claim 4 wherein the image-processing module is further configured to associate the stereo calibration data with a particular stereo image pair based on the download history data for the particular stereo image pair when the corresponding first and second images of the particular stereo image pair are not of the calibration pattern.

6. The system of claim 1 wherein the portable image capture device transmits the first and second images via a communication link selected from a group consisting of a wired connection and a wireless communication link.

7. The system of claim 1 wherein:
    the UI module is further configured to receive;
        a third user input designating a first measurement point in the corresponding first image;
        a fourth user input designating a second measurement point in the corresponding first image;
        a fifth user input designating the first measurement point along a selection assist line in the corresponding second image; and
        a sixth user input designating the second measurement point along another selection assist line in the corresponding second image; and
    the measurement application further comprises:
        a point selection module to identify a range of points in the corresponding second image based on the first measurement point designated in the corresponding first image, to generate the selection assist line in the corresponding second image based on the range of points, to identify another range of points in the corresponding second image based on the second measurement point designated in the corresponding first image, and to generate the other selection assist line in the corresponding second image based on the other range of points;
        a stereo point module to define a first stereo point based on the first measurement point designated in the corresponding first and second images and to define a second stereo point based on the second measurement point designated in the corresponding first and second images;
        a cross measure module to calculate a distance between the first stereo point and the second stereo point; and
        a reporting module to create a customized report comprising at least one of the calculated distance between the first stereo point and the second stereo point and the calculated symmetry deviations.

8. The system of claim 7 further comprising a measurement database to store reference stereo point data corresponding to at least one reference stereo point on each of the plurality of objects, wherein the reporting module is further configured to create the customized report comprising calculated distances selected from a group consisting of a first distance between the first stereo and the second stereo point, a second distance between the first stereo point and the reference stereo point, and a third distance between the second stereo point and the reference stereo point.

9. A system for obtaining measurements of an object, the system comprising:
    a hand-held image capture device to capture a stereo image of each of a plurality of objects, each stereo image comprising first and second images of a particular one of the plurality of objects, the hand-held image capture device comprising:
        a first camera to capture the first image of the object;
        a second camera to capture the second image of the object;
        a communication port to transmit the first and second images; and
    a processing system comprising a measurement application executable on the processing system, the measurement application comprising:
        a user interface (UI) module to generate corresponding first and second images of a selected stereo image for display and to receive;
        a first user input designating a first set of points in a first pair of images and a second user input designating a second set of points in a second pair of images, wherein the first pair of images comprises the first and second images of a portion of the object, and wherein the second pair of image comprises other first and second images of an opposite portion of the object; and a symmetry module configured to:
define a central reference plane between the first set of points in the first pair of images and the second set of points in the second pair of images; and
calculate symmetry deviations between the first set of points and the second set of points as a function of the defined central reference plane, wherein the user interface (UI) module is further configured to generate the symmetry deviations for display.

10. The system of claim 9 wherein the hand-held capture device further comprises:
a monitor to display the first and second images of each of the plurality of objects; and
a switch to control the first camera and second cameras to capture the first and second images of each object simultaneously.

11. The system of claim 9 wherein the hand-held capture device transmits the first and second images via a communication link selected from a group consisting of a wired connection and a wireless communication link.

12. The system of claim 9 wherein the UI module further receives:
a third user input designating a first measurement point in the corresponding first image;
a fourth user input designating a second measurement point in the corresponding first image;
a fifth user input designating the first measurement point in the corresponding second image along a selection assist line; and
a sixth user input designating the second measurement point in the corresponding second image along another selection assist line; and
the measurement application further comprises:
a point selection module to identify a range of points in the corresponding second image based on the first measurement point designated in the corresponding first image, to generate the selection assist line in the corresponding second image based on the range of points, to identify another range of points in the corresponding second image based on the second measurement point designated in the corresponding first image, and to generate the other selection assist line in the corresponding second image based on the other range of points;
a stereo point module to define a first stereo point that corresponds to the first measurement point designated in the corresponding first and second images and to define a second stereo point that corresponds to the second measurement point designated in the corresponding first and second images;
a cross measure module to calculate a distance between the first stereo point and the second stereo point; and
a reporting module to create a customized report comprising the calculated distance between the first stereo point and the second stereo point and the calculated symmetry deviations.

13. The system of claim 12 further comprising a measurement database to store reference stereo point data corresponding to at least one reference stereo point on each of the plurality of objects, wherein the reporting module is further configured to create the customized report comprising calculated distances selected from a group consisting of a first distance between the first stereo and the second stereo point, a second distance between the first stereo point and the reference stereo point, and a third distance between the second stereo point and the reference stereo point.

14. The system of claim 9 wherein the measurement application further comprises:
an image-processing module to process the first and second images to determine if the first and second images are images of a calibration pattern; and
a stereo calibration module to determine stereo calibration data for the hand-held image capture device when the first and second images are of the calibration pattern, the stereo calibration data comprising location information for the first camera relative to the second camera in a coordinate system of the hand-held image capture device, and wherein the stereo calibration module is configured to store the stereo calibration data in a memory.

15. A method for obtaining measurements of an object comprising:
capturing first and second images of a plurality of objects at an image capture device;
transmitting the first and second images from the image capture device to a processing system;
storing first and second images of a particular object that were captured simultaneously as a stereo image pair in a memory of the processing system;
generating a list of stereo image pairs stored in the memory for display;
displaying corresponding first and second images of a selected one of the list of stereo image pairs;
receiving a first user input designating a first set of points in the stereo image pair and receiving a second user input designating a second set of points in a second stereo image pair, wherein the stereo image pair comprises the corresponding first and second images of a portion of the particular object, and wherein the second stereo image pair comprises second corresponding first and second images of an opposite portion of the particular object;
defining a central reference plane between the first set of points in the stereo image pair and the second set of points in the second stereo image pair;
calculating symmetry deviations between the first set of points and the second set of points as a function of the defined central reference plane; and
displaying the symmetry deviations.

16. The method of claim 15 wherein the first and second images are transmitted from the image capture device via a communication link selected from a group consisting of a wired connection and a wireless communication link.

17. The method of claim 15 further comprising:
receiving a third user input designating a first measurement point in the corresponding first image and receiving a fourth user input designating a second measurement point in the corresponding first image;
identifying a range of points in the corresponding second image based on the first measurement point designated in the first image and identifying another range of points in the corresponding second image based on the second measurement point designated in the first image;
generating a first selection assist line in the corresponding second image based on the range of points and generating a second selection assist line in the corresponding second image based on the other range of points;
receiving a fifth user input designating the first measurement point in the second image along the first selection assist line and receiving a sixth user input designating the second measurement point in the second image along the second selection assist line;

defining a first stereo point based on the first measurement point and a second stereo point based on the second measurement point;

calculating a distance between the first stereo point and the second stereo point; and creating a customized report comprising the calculated distance between the first stereo point and the second stereo point.

18. The method of claim 17 further comprising storing reference stereo point data corresponding to at least one reference stereo point on each of the plurality of objects, and wherein the customized report comprises calculated distances selected from a group consisting of a first distance between the first stereo and the second stereo point, a second distance between the first stereo point and the reference stereo point, and a third distance between the second stereo point and the reference stereo point.

19. A method for obtaining measurements from stereo images of an object, the stereo image comprising first and second images, the method comprising:

capturing the stereo image at a hand-held image capture device, the hand-held image capture device comprising a first camera, a second camera, and a communication port;

capturing the first image of the object at the first camera;

capturing the second image of the object at the second camera;

transmitting the first and second images from the communication port;

receiving a first user input designating a first set of points in a first pair of images and receiving a second user input designating a second set of points in a second pair of images, wherein the first pair of images comprises the first and second images of a portion of the object, and wherein the second pair of image comprises other first and second images of an opposite portion of the object;

defining a central reference plane between the first set of points in the first pair of images and the second set of points in the second pair of images;

calculating symmetry deviations between the first set of points and the second set of points as a function of the defined central reference plane; and displaying the symmetry deviations.

20. The method of claim 19 further comprising:

receiving the first and second images at a processing system and, in response thereto, generating the first image and the second image for display;

receiving a third user input designating a first measurement point in the first image and receiving a fourth user input designating a second measurement point in the first image;

identifying a range of points in the second image based on the first measurement point designated in the first image and identifying another range of points in the second image based on the second measurement point designated in the first image;

generating a selection assist line in the second image based on the range of points and generating another selection assist line in the second image based on the other range of points;

receiving a fifth user input designating the first measurement point in the second image along the selection assist line and receiving a sixth user input designating the second measurement point in the second image along the other selection assist line;

defining a first stereo point that corresponds to the first measurement point and defining a second stereo point that corresponds to the second measurement point; and creating a customized report for display comprising the calculated distance between the first stereo point and the second stereo point.

21. The method of claim 20 further comprising storing reference stereo point data corresponding to at least one reference stereo point on each of the plurality of objects, and wherein the customized report further comprises calculated distances selected from a group consisting of a first distance between the first stereo and the second stereo point, a second distance between the first stereo point and the reference stereo point, and a third distance between the second stereo point and the reference stereo point.

* * * * *